(12) United States Patent
Kawata et al.

(10) Patent No.: US 6,340,649 B1
(45) Date of Patent: Jan. 22, 2002

(54) COMPOSITION OF DIELECTRIC CERAMICS AND PRODUCING METHOD THEREOF

(75) Inventors: Tomoaki Kawata, Tokyo; Akira Nakamura; Toshio Sakurai, both of Chiba; Aya Fukuhara, Tokyo, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/525,942

(22) Filed: Mar. 15, 2000

(30) Foreign Application Priority Data

Mar. 16, 1999 (JP) ............................. 11-070005
Jul. 22, 1999 (JP) ............................. 11-207461

(51) Int. Cl.$^7$ ............................. C04B 35/468
(52) U.S. Cl. ............................. 501/138; 501/139
(58) Field of Search ............................. 501/138, 139

(56) References Cited

U.S. PATENT DOCUMENTS

| 4,987,107 A | * | 1/1991 | Narumi et al. ............ 501/137 |
| 5,292,694 A | * | 3/1994 | Abe et al. ............ 501/139 |
| 6,184,165 B1 | * | 2/2001 | Kawata ............ 501/32 |

FOREIGN PATENT DOCUMENTS

| EP | 0 973 173 | | 1/2000 | |
| JP | 61-56407 | | 3/1986 | |
| JP | 2-44609 | | 2/1990 | |
| JP | 3290359 | | 12/1991 | |
| JP | 3-295854 | | 12/1991 | |
| JP | 3-295855 | | 12/1991 | |
| JP | 3-295856 | | 12/1991 | |
| JP | 5-97508 | | 4/1993 | |
| JP | 05120915 | * | 5/1993 | ............ 501/139 |
| JP | 5-234420 | | 9/1993 | |
| JP | 6-116023 | | 4/1994 | |
| JP | 6-150719 | | 5/1994 | |
| JP | 6-162822 | | 6/1994 | |
| JP | 6-211564 | | 8/1994 | |
| JP | 6-223625 | | 8/1994 | |
| JP | 7-69719 | | 3/1995 | |
| JP | 8-55518 | | 2/1996 | |
| JP | 8-55519 | | 2/1996 | |
| JP | 8-157257 | | 6/1996 | |
| JP | 8-167322 | | 6/1996 | |
| JP | 8-167323 | | 6/1996 | |
| JP | 8-167324 | | 6/1996 | |
| JP | 8-208328 | | 8/1996 | |
| JP | 8-208329 | | 8/1996 | |
| JP | 8-245262 | | 9/1996 | |
| JP | 8-277161 | | 10/1996 | |
| JP | 2613722 | | 2/1997 | |
| JP | 2781500 | | 5/1998 | |
| JP | 2781501 | | 5/1998 | |
| JP | 2781502 | | 5/1998 | |
| JP | 2781503 | | 5/1998 | |
| JP | 2786977 | | 5/1998 | |

OTHER PUBLICATIONS

Patent Abstracts of Japan, vol. 1998, No. 08, Jun. 30, 1998, JP 10–067557, Mar. 10, 1998.

* cited by examiner

*Primary Examiner*—David Brunsman
(74) *Attorney, Agent, or Firm*—Oblon, Spivak, McClelland, Maier & Neustadt, P.C.

(57) ABSTRACT

The composition of dielectric ceramics is formed in that a main component is expressed with a general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$), and in relation with the main components, sub-components are contained of Cu oxides 0.1 to 3.0 wt % in terms of CuO, Zn oxide 0.1 to 4.0 wt % in terms of ZnO, and B oxide 0.1 to 3.0 wt % in term of $B_2O_3$. It is preferable that Ag 0.3 to 1.5 wt % is contained as the sub-component.

9 Claims, 4 Drawing Sheets

COMPOSITION OF DIELECTRIC CERAMICS AND PRODUCING METHOD THEREOF

BACKGROUND OF THE INVENTION

1. Field of the Invention

The present invention relates to composition of dielectric ceramics, in particular such composition of dielectric ceramics having a sintering property at low temperature, enabling to use, as an internal conductor, Ag or alloys containing a main component of Ag, and a method therefor.

2. Description of the Related Art

Recently, the growth of communication of those moving such as car telephones, pocket telephones and others is remarkable. In the communication of these moving ones, high frequency zone called as quasi microwaves of several 100 MHz to several GHz is used. Therefore, high frequency characteristics are made great account also in electronic devices as resonators, filters or capacitor to be used in the communication instruments of the moving ones. As to the recent popularization of the moving communication, miniaturization and low cost of the communicating instruments are important factors other than improvement of services, and are demanded also in regard to electronic devices.

For example, in materials for resonators, the following characteristics (1) to (4) are required for the using frequency to improve and miniaturize the high frequency characteristics.

(1) Specific dielectric constant is large: The resonator to be used nearly the microwave often utilizes a fact that the wave length is shortened in a dielectric substance in proportion to the inverse number of a square root of dielectric constant, and the length of the resonator can shorten the wave length in proportion of the reverse number of the square root of the dielectric constant.

(2) Q is large: For the materials of the microwave, Q to be defined with $Q=1/\tan \delta$ is used as valuation of dielectric loss, and that Q is large says the loss is small.

(3) Temperature change of the dielectric constant is small: The temperature change of the resonance frequency of the resonator or the filter is controlled to the utmost, and so it is desirous that the temperature change of the dielectric constant is small.

(4) The sintering at low temperature is possible: For realizing the miniaturization of electronic devices, parts of surface mount devices (SMD) holding conductive electrodes within interiors thereof have been changing to main streams. In this case, it is desirable to use Ag or Cu being low resistance as internal conductive electrodes for heightening the loss characteristics of the electronic device. But Ag or Cu have low melting points, and it is required that compositions for the dielectric ceramics may be sintered at temperature lower than their melting points. The matter of simultaneous sintering is also pointed out when Ag or Cu is made capacitor materials for temperature compensation.

As materials of dielectric ceramics for the microwave, compositions as $BaO-4TiO_2$ group or BaO-rare earth oxides-$TiO_2$ group are well known. In particular, as $BaO-Nd_2O_3-TiO_2$ group is high in the dielectric constant and the Q value, comprehensive studies have been made thereon. Of late years, the sintering at low temperature has been carried out in these compositions, and such technologies are described in patent 2613722 (calcining main components, followed by pulverizing until predetermined powder diameter, and adding sub-components thereto), Japanese patent No. 2781500, Japanese patent No. 2781501, Japanese patent No. 2781502, Japanese patent No. 2781503, and Japanese patent No. 2786977 (these Japanese patents use glass as sub-component), JP-A-5-234420, JP-A-6-211564, JP-A-6-223625, JP-A-7-69719, JP-A-8-55518, JP-A-8-55519, JP-A-8-167322, JP-A-8-167323, JP-A-8-167324, JP-A-8-208328, JP-A-8-208329 (these contain glass as a sub-component), JP-A-3-290359, JP-A-3-295854, JP-A-3-295855, JP-A-3-295856, JP-A-6-116023, JP-A-6-150719, JP-A-6-162822, JP-A-8-55518, JP-A-8-167322, JP-A-8-167323, JP-A-8-167324, JP-A-8-208328, JP-A-8-208329, JP-A-8-245262 (these contain Ge oxide as a sub-component), and other JP-A-61-56407, JP-A-2-44609, JP-A-5-97508, JP-A-6-116023, JP-A-8-157257, and JP-A-8-277161.

In almost all of them, BaO-rare earth oxides-$TiO_2$ are main components to which glass composition or glass composition and several kinds of sub-components are added capable of carrying out the sintering at low temperature. In addition, many of the dielectric materials contain PbO and $Bi_2O_3$ in the main components or added components. This is why, since PbO and $Bi_2O_3$ also have promoting effects of the sintering at low temperature together with an improving effect of the property such as increasing the dielectric constant, effects of both enable to provide the materials sintered at low temperature for high frequency.

Since the dielectric ceramics of $BaO-Nd_2O_3-TiO_2$ group is as mentioned high in the dielectric constant and Q, and small in temperature coefficient of the dielectric constant, it is utilized for dielectric substance for microwave. The sintering at low temperature has recently been realized in $BaO-Nd_2O_3-TiO_2$ group, and most of them contain at least one of PbO and $Bi_2O_3$ for improving the properties and promoting the sintering at low temperature.

However, environmental protection campaign of a global scale has lately been raised. Therefore, also in the fields of electronic parts, it is expected to reduce environmental contaminating substances as PbO, $Bi_2O_3$ and others. When substances contain environmental contamination, treating facilities of waste liquid or special equipment are necessary in manufacturing processes, and also in view of production cost, it is desirous not to contain such environmental contaminating substances. Further, PbO, and $Bi_2O_3$ are easily evaporated at high temperature, and ready for dispersing factors, and yet being neither PbO nor $Bi_2O_3$ is desired.

Further, for most of the conventional composition of dielectric ceramics, as mentioned above, the glass composition is indispensable as additives for promoting the sintering, and therefore it is necessary to previously make predetermined glass, inviting cost-up by increasing a production step and enhancing unstable elements. Besides, since a limitation of composition for glass is added due to glazing, an optimum composition is not always realized and properties of dielectric ceramics might be deteriorated. On the other hand, studies have been made on dielectric ceramicss not added with glass, but since many of them necessitate the sintering temperature of 1000° C. or higher, there arises a problem that, for example, Ag cannot be used as an internal conductor.

In the conventional composition of dielectric ceramics, in case Ag as the internal conductor is sinterd, it is diffused into an interior of the dielectric substance. Since this Ag diffusion is caused by an Ag concentration gradient, the Ag concentration in the interior of the dielectric substance is not uniform, for example, the Ag concentration is high around the Ag conductor, while it is low in parts separate therefrom. When Ag is diffused in the dielectric substance, the dielectric properties are changed by the Ag concentration, and therefore electronic parts where Ag is the internal conductor will have such dielectric properties made different depending on the parts, causing inconveniences of non-uniform device property so that desired device properties could not be provided. By the Ag diffusion in the dielectric substance, the Ag amount is decreased in the internal conductor, thereby also causing inconveniences of non-uniform device properties so that desired device properties could not be provided.

In case the Ag diffusion amount from the internal conductor into the dielectric substance is much, there is generated a space between the internal conductor and the dielectric substance or caused a leading-in in a portion of the conductor for connecting with an external part, so that an inconvenience as disorder of conduction is caused. In particular, recently miniaturization of high frequency parts has rapidly been advanced, and in response to such conditions, the internal conductor has been made fine pattern or thin in height. Therefore, the above mentioned space between the internal conductor and the dielectric matrix or inconvenience caused by the leading-in in the portion of the conductor for connecting with an external part have been serious problems.

SUMMARY OF THE INVENTION

The invention has been realized in view of such circumstances, and it is an object of the present invention to provide a composition of dielectric ceramics which does not contain any environmental contaminating substances such as PbO, $Bi_2O_3$ and others, enables to be sintered at low temperature in spite of using no glass composition and which, though employing Ag or Ag alloys as the internal conductor, is least in dispersion of dielectric property due to the Ag diffusion, and enables to provide dielectric ceramics for microwave generating neither occurrence of any space between the internal conductor and the dielectric substance nor any leading-in in the portion of the internal conductor for communicating with the external part, and to offer a method for making such composition of dielectric ceramics.

For accomplishing such an object, the inventive composition of dielectric ceramics is formed in that main components are expressed with a general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$), and in relation with the main components, sub-components are contained of Cu oxides 0.1 to 3.0 wt % in terms of CuO, Zn oxide 0.1 to 4.0 wt % in terms of ZnO, and B oxide 0.1 to 3.0 wt % in term of $B_2O_3$.

In the invention, by Cu oxide, Zn oxide and B oxide added in the desired amount together with the main components of $BaO$—$Nd_2O_3$—$TiO_2$ group contained in the desired composition range, while substantially maintaining the dielectric properties, the sintering temperature of the composition of the dielectric ceramics goes down the melting point or lower of Ag or Cu, otherwise alloys of Ag or Cu being a main component.

Further, for accomplishing such an object, the inventive composition of dielectric ceramics is formed in that main components are expressed with a general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$), and in relation with the main components, sub-components are contained of Cu oxides 0.1 to 3.0 wt % in terms of CuO, Zn oxide 0.1 to 4.0 wt % in terms of ZnO, and B oxide 0.1 to 3.0 wt % in term of $B_2O_3$, and further preferably contained of Ag 0.3 to 1.5 wt %.

A method for producing the inventive composition of dielectric ceramics comprises the steps of (1) mixing raw materials of BaO, $Nd_2O_3$ and $TiO_2$, calcining them at temperature of 1100° C. or higher and manufacturing powders of base materials expressed with a general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$); (2) calcining, at temperature of sintering temperature or lower of the base material powders, said powders mixed such that sub-components in relation with the base powders fall into ranges of Cu oxides 0.1 to 3.0 wt % in terms of CuO, Zn oxide 0.1 to 4.0 wt % in terms of ZnO, and B oxide 0.1 to 3.0 wt % in term of $B_2O_3$; and (3) pulverizing the calcined powders until predetermined powder diameter.

Further, a method for producing the inventive composition of dielectric ceramics, in the case of containing Ag as a sub-component, comprises the steps of (1) mixing raw materials of BaO, $Nd_2O_3$ and $TiO_2$, calcining at temperature of 1100° C. or more and making powders of base materials expressed with a general formula of $xBaO \cdot yNd_2O_3 \cdot zTiO_2$ (provided that the main components have the relation of $6 \leq x \leq 23$, $13 \leq y \leq 30$, $64 \leq z \leq 68$ and $x+y+z=100$); (2) calcining, at temperature of sintering temperature or lower of the base material powders, said powders mixed such that sub-components in relation with the base powders fall into ranges of Cu oxides 0.1 to 3.0 wt % in terms of CuO, Zn oxide 0.1 to 4.0 wt % in terms of ZnO and B oxide 0.1 to 3.0 wt % in term of $B_2O_3$, (3) adding to the calcined powders Ag as a further sub-component to be range of 0.3 to 1.5 wt % in relation with the base material powders and pulverizing the calcined powders until predetermined powder diameter. Ag 0.3 to 1.5 wt % may be added in the step (1) or step (2).

In addition, a method for producing the inventive composition of dielectric ceramics employs such an addition form of Ag as the sub-component that is at least one kind of metallic Ag powder, $AgNO_3$, $Ag_2O$ and AgCl, and carries out the step (1) at predetermined temperature within the range of 1100 to 1350° C.

In the invention, by Cu oxide, Zn oxide and B oxide added in the desired amount together with the main components of $BaO$—$Nd_2O_3$—$TiO_2$ group contained in the desired composition range, while substantially maintaining the dielectric properties, the sintering temperature of the composition of the dielectric ceramics goes down the melting point or lower of Ag or alloys of Ag being a main component, and the Ag added as the sub-component in the desired amount serves to suppress the Ag diffusion into the dielectric substance when Ag or Ag alloys are used as the internal conductor.

BRIEF DESCRIPTION OF THE DRAWINGS

In the accompanying drawings:

FIGS. 1A and 1B are views showing one example of a chip capacitor, in which FIG. 1A is a plan view and FIG. 1B is a cross sectional view along I—I line in the chip capacitor shown in FIG. 1A;

FIGS. 3A and 3B are views showing an example of a chip capacitor for testing conductivity, in which FIG. 3A is a plan view and FIG. 3B is a cross sectional view along II—II line in the chip capacitor shown in FIG. 3A.

PREFERRED EMBODIMENTS OF THE INVENTION

Figure 1A:
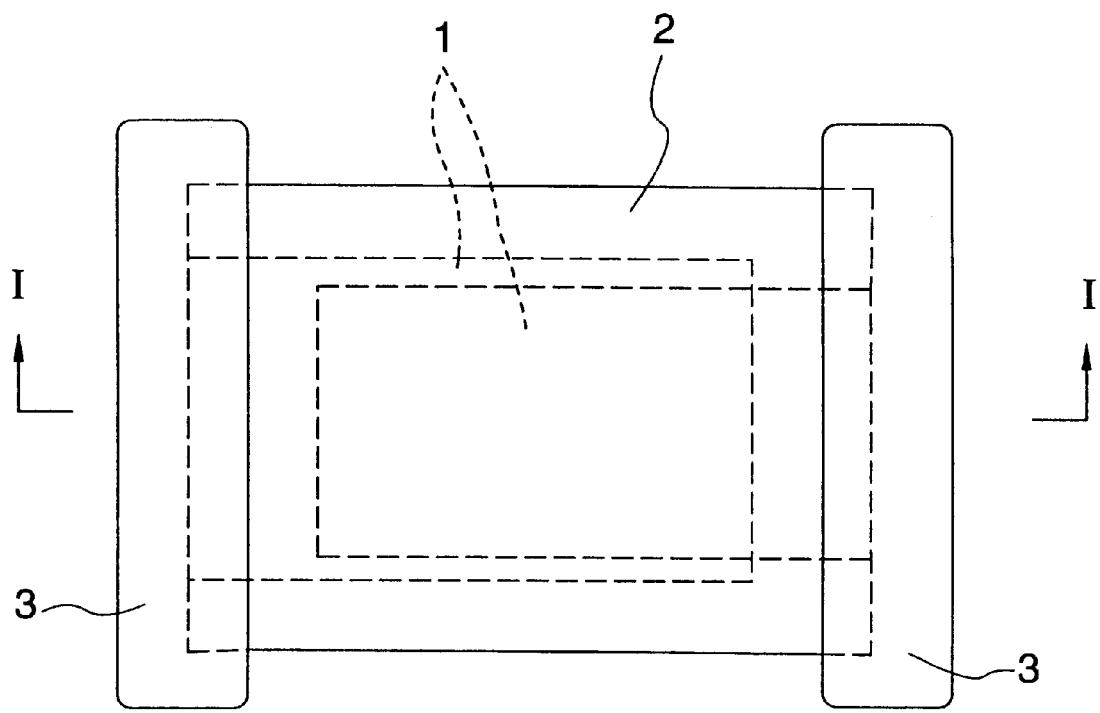

Reference will be made to embodiments of the invention. Composition of dielectric ceramics The inventive composition of dielectric ceramics contains, as the sub-components, Cu oxides, Zn oxide, B oxide, and Ag in relation with the main components which are expressed with the general formula of $xBaO \cdot yNd_2O_3 \cdot zTiO_2$.

The main components satisfy the following relation in x, y and z.

$6 \leq x \leq 23$ $13 \leq y \leq 30$ $64 \leq z \leq 68$, and $x+y+z=100$

The contained amount of each of the sub-components is determined within the under ranges in relation with the main components.

---
Cu oxide: 0.1 to 3.0 wt % in terms of CuO
Zn oxide: 0.1 to 4.0 wt % in terms of ZnO
B oxide: 0.1 to 3.0 wt % in terms of $B_2O_3$, and
Ag: 0.3 to 1.5 wt %.
---

Here, Ag is not always necessary, but is preferable to add.

The composing ranges of the main components and the containing ranges of the sub-components as mentioned above are determined in accordance with the dielectric properties aimed at by the invention, and reference will be made thereto.

The invention evaluates the dielectric properties as follows with respect to ① the low temperature sintering property, ② the specific dielectric constant, ③ the temperature coefficient of the dielectric constant (called as "TCC" hereinafter) and ④ the Q (1/tan δ) property.

① The Low Temperature Sintering Property

The invention is to offer the composition of the dielectric ceramics capable of being sintered at low temperature to be used to the electronic devices where Ag or Cu, or alloys of Ag or Cu being one of the main components. Therefore, the low temperature sintering property is most important. Actually, it is judged that practically available are those having the density of the sintered substance of 5.0 g/cm³ or more after having been sinterd at temperature of 920° C.

② The Specific Dielectric Constant

For example, when the inventive composition of the dielectric ceramics is used to the resonator of the dielectric substance for the high frequency, since the length of the resonator depends on the magnitude of the dielectric constant, it is advantageous that the dielectric constant is large for miniaturizing the resonator. But the composition of the dielectric ceramics of the invention may be employed to various electronic devices where Aq or Cu, or alloys of Ag or Cu being the main component is the internal conductor, and preferable values of the dielectric constant cannot be instantly determined. Therefore, the invention does not especially take the values of the dielectric constant into consideration.

③ TCC

In the invention, TCC (ppm/° C.) is calculated by the following formula.

$TCC=[(C_{85°C}-C_{-25°C})/C_{25°C}] \times (1/110° C.) \times 10^6$ herein, TCC: temperature coefficient of the dielectric constant of −25° C. to 85° C.

$C_{85°C}$: Capacitance at 85°

$C_{-25°C}$: Capacitance at −25° and $C_{25°C}$: Capacitance at 25° C.

For example, it is preferable that TCC is within ±30 ppm/° C. in the resonator of the dielectric constant and that TCC is within ±100 ppm/° C. in the filter of the dielectric substance. In addition, TCC widens the application field by having comprehensive values in the capacitor for temperature compensation. And for enabling to apply the inventive composition for dielectric ceramics to the resonator of the dielectric constant, the filter of the dielectric substance or the capacitor for temperature compensation, it is preferable that a target of TCC is set near 0 (zero), but there is no problem even if the absolute value of TCC due to temperature change is large.

④ The Q Property

As above stated, the invention is to offer the composition of the dielectric ceramics capable of being sintered at low temperature to be used to the electronic devices where Ag or alloys of Ag being the main components, and the lowering of the Q property tells that loss of the electric device is large, and therefore the Q property larger than a certain extent is necessary, and so the invention determines the target of the Q property to be 1000 or more.

The dielectric properties evaluated as stated above of ① the low temperature sintering property, ② the specific dielectric constant, ③ TCC and ④ the Q property largely depend on the main components of the composition of the dielectric ceramics, and if the main components are out of the range of the inventive composition, there arise inconveniences as referred to under.

If BaO is less than 6 mol %, the dielectric constant lowers and the low temperature sintering property also lowers (after sintering at 920° C., the density of the sintered substance becomes less than 5.0 g/cm³). As the lowering of the low temperature sintering property is fatal to the object of the invention of offering electric devices where Ag or alloys of Ag being a main component is the internal conductor, the amount of BaO is limited in range capable of securing the low temperature sintering property. If BaO exceeds 23 mol %, the dielectric constant becomes large and the low temperature sintering property enhances, so that TCC largely shifts to a minus (−) side and the Q property goes down (less than 1000). Since the lowering of the Q property undesirably invites an increment of loss of electronic devices, the amount of BaO is limited in range capable of securing the Q property (1000 or more).

If $Nd_2O_3$ is less than 13 mol %, although the dielectric constant increases and the low temperature sintering property enhances, since the Q property go down (less than 1000), the amount of $Nd_2O_3$ is limited in range capable of securing the Q property. On the other hand, if $Nd_2O_3$ exceeds 30 mol %, undesirably the dielectric constant goes down and the lower temperature sintering property lowers (after sintering at 920° C., the density of the sintered substance becomes less than 5.0 g/cm³).

If $TiO_2$ is less than 64 mol %, undesirably TCC largely shifts toward a plus (+) side as well as the Q property deteriorates (less than 1000). If $TiO_2$ exceeds 68 mol %, the low temperature sintering property lowers as well as TCC largely shifts toward the minus (−) side. Therefore, the amount of $TiO_2$ is limited to a range enabling to secure the low temperature sintering property.

If the sub-components in the inventive composition of the dielectric ceramics are out of the above mentioned range, there arise inconveniences as referred to under.

If Cu oxide is less than 0.1 wt % in terms of CuO in relation with the main components, the lowering temperature sintering effect by Cu oxide is made insufficient. If exceeding 3.0 wt %, the Q property undesirably goes down (less than 1000), and as the dielectric constant is nonlinearly changed with respect to temperature, it is unwelcome to use for electric devices. Especially, it is preferable that Cu oxide is 0.5 to 1.5 wt % in terms of CuO in relation with the main components.

If Zn oxide is less than 0.1 wt % in terms of ZnO in relation with the main component, the lowering temperature sintering effect by Zn oxide is undesirably made insufficient. On the other hand, even if exceeding 4.0 wt %, the low temperature sintering property is not improved following an increase of containing amounts, but conversely it is lowered to cause decrease of the dielectric constant or deterioration of the dielectric property as lowering of the Q property.

If B oxide is less than 0.1 wt % in terms of $B_2O_3$ in relation with the main component, the lowering temperature sintering effect by B oxide is made insufficient. On the other hand, even if exceeding 3.0 wt %, the low temperature sintering property is not improved following an increase of containing amounts, but conversely it is lowered to cause decrease of the dielectric constant or deterioration of the dielectric property as lowering of the Q property.

A reason why Ag is preferably contained as the sub-component in the composition of the dielectric ceramics, is because for suppressing the Ag diffusion into the dielectric substance matrix from the internal conductor when Ag or Ag alloys are used as the internal conductor. If Ag of the sub-component performing such service is less than 0.3 wt % in relation with the main components, the suppression of the Ag diffusion is made unsatisfied to cause inconveniences by the Ag diffusion, for example, occurrence of dispersion of the dielectric constant by non-uniformity of Ag amount within the dielectric substance, occurrence of spaces between the conductor and the dielectric substance matrix by reduction of Ag amount in the internal conductor, otherwise conductive badness by leading-in of the internal conductor at a portion of connecting with an external part. The dielectric constant trends to be large as increasing of Ag amount, and if Ag is more than 1.5 wt % in relation with the main component, it exceeds an allowable uptake amount of the Ag diffusion in the dielectric substance and Ag is segregated in the dielectric substance matrix to undesirably affect bad influences to reliabilities of voltage, load, life and others.

The Method of Making Composition of Dielectric Ceramics

Still further explanation will be made to the method of making the inventive composition of dielectric ceramics.

At first, oxides of barium, neodymium and titanium as main components are prepared, and predetermined amounts are weighted, mixed and calcined. The mixing is carried out in the range satisfying the general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$). With respect to raw materials for the main components, oxides are not necessarily required, for example, when employing substances which turn out oxides by a heat treatment such as carbonate, hydroxide, sulfide and others, it is possible to obtain a composition for dielectric ceramics equivalent to a case of using oxides.

The mixing of the main components may depend on a wet mixture using, e.g., water, and a mixing time may be set around 4 to 24 hours. The sintering is a course of composing compounds (BaO-rare earth oxide-$TiO_2$) from the mixture of raw materials for the main components at 1100° C. ormore, preferably 1100 to 1350° C. for 1 to 24 hours.

Next, the predetermined amounts of the sub-components of Cu oxide, Zn oxide and B oxide are weighed and mixed in the calcined main components (powders of base materials). According to necessity, Ag is weighed and mixed in the calcined main components. That is, the mixture is carried out such that sub-components in relation with the base material powders fall into ranges of Cu oxides 0.1 to 3.0 wt % in terms of CuO, Zn oxide 0.1 to 4.0 wt % in terms of ZnO, and B oxide 0.1 to 3.0 wt % in term of $B_2O_3$. In case of adding Ag, Ag 0.3 to 1.5 wt % is preferably mixed. Also with respect to Cu, Zn and B, oxides are not necessarily required as the raw materials of the main components, for example, when employing substances which turn out oxides by a heat treatment such as carbonate, hydroxide, sulfide and others, it is possible to obtain a composition for dielectric ceramics equivalent to a case of using oxides. Also as to Ag, the metallic Ag is not necessarily required and it is possible to obtain a composition for dielectric ceramics equivalent to a case of using the metallic Ag if employing substances which turn out metallic Ag by a heat treatment such as $AgNO_3$, $Ag_2O$ and AgCl.

The main components and the sub-components may be mixed by, for example, the wet mixture using the water or the like.

The mixed and pulverized substances are again calcined at temperature lower than the sintering temperature, for example, 650 to 850° C. for 1 to 10 hours, and ground to desired diameter. By again calcining, it is possible to uniformly disperse the main and sub-components, to obtain powders of narrow distribution, and accordingly to heighten working effectiveness as a molding in a later process.

The obtained powder is mixed with an organic binder as polyvinyl alcoholic, acrylic or ethylcellulose groups, and then molded into a desired shape, followed by sintering and sintering. The molding may depend on a wet molding of a sheet method or a printing method, or a dry molding of a press shaping. In view of desired shapes, the molding methods may be selected as desired. The sintering is preferably performed in an oxygen atmosphere, for example, as an air. The sintering temperature is suitable below the melting point of Ag or Cu, or Alloys of Ag or Cu to be used as the internal conductor, and may preferably be set at around 850 to 1100° C., preferably 850 to 950° C., and the sintering time is desirably 1 to 24 hours. Accordingly, the baking is possible at low temperature as below the melting points Ag or Cu otherwise alloys of Ag or Cu as the main components. It is therefore possible to compose electronic parts where metals of low melting points as Ag or Cu having low resistance are internal conductors, resulting in improvement, miniaturi-zation and cost-down of various properties of devices for high frequency.

A still further reference will be made to another modified embodiment of the making method of the inventive composition of dielectric ceramics in case of containing Ag.

At first, oxides of barium, neodymium and titanium as main components are prepared, and predetermined amounts are weighted, mixed and temporarily sinterd. The mixing is carried out in the range satisfying the general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$). With respect to raw materials for the main components, oxides are not necessarily required, for example, when employing substances which turn out oxides by a heat treatment such as carbonate, hydroxide, sulfide and others, it is possible to obtain a composition for dielectric ceramics equivalent to a case of using oxides.

The mixing o f the main components may depend on a wet mixture using, e.g., water and a mixing time may be set around 4 to 24 hours. The culcined is a course of composing compounds (BaO-rare earth oxide-$TiO_2$) from the mixture of raw materials for the main components, at temperature of 1100° C. or more, preferably 1100 to 1350° C. for 1 to 24 hours.

Next, the predetermined amounts of the sub-components of Cu oxide, Zn oxide, B oxide are weighed and mixed in the calcined main components (powders of base materials). That is, the mixture is carried out such that sub-components in relation with the base powders fall into ranges of Cu oxides 0.1 to 3.0 wt % in terms of CuO, Zn oxide 0.1 to 4.0 wt % in terms of ZnO, and B oxide 0.1 to 3.0 wt % in term of $B_2O_3$. Also in this case, as the main components, Cu, Zn and B are not necessarily oxide, for example, when employing substances which turn out oxides by a heat treatment such as carbonate, hydroxide, sulfide and others, it is possible to obtain a composition for dielectric ceramics equivalent to a case of using oxides.

The main components and the sub-components may be mixed by, for example, the wet mixture using the water.

The mixed and pulverized substances are again calcined at temperature lower than the sintering temperature, for example, 650 to 850° C. for 1 to 10 hours. By again calcining, it is possible to uniformly disperse the main and sub-components, to obtain powders of narrow distribution, and to heighten working effectiveness as a molding in a later process.

Subsequently, the calcined powder obtained by the second calcined is mixed with Ag of the sub-component weighed to the predetermined amount (mixed such that Ag falls in the range of 0.3 to 1.5 wt % in relation with the powder of the base materials) and is pulverized to desired powder diameter. As to Ag, the metallic Ag is not necessarily required, and it is possible to obtain a composition for dielectric ceramics equivalent to a case of using the metallic Ag if employing substances which turn out metallic Ag by a heat treatment such as $AgNO_3$, $Ag_2O$ and AgCl.

The obtained powder is mixed with an organic binder as polyvinyl alcoholic, acrylic or ethylcellulose groups, and then molded into a desired shape, followed by sintering and sintering. The molding may depend on a wet molding of a sheet method or a printing method, or a dry molding of a press shaping. In view of desired shapes, the molding methods may be selected as desired. The sintering is preferably performed in an oxygen atmosphere, for example, as an air. The sintering temperature is suitable below the melting point of Ag or Ag alloys to be used as the internal conductor, and may preferably be set at around 850 to 950° C., and the sintering time is desirably 1 to 24 hours.

The composition of dielectric ceramics produced by the inventive method may be sintered at low temperature as below the melting points Ag or Cu, or alloys of Ag or Cu as the main component. It is therefore possible to compose electronic parts where metals of low melting points as Ag or Cu, or alloys of Ag or Cu having low resistance are internal conductors. Further, in case where Ag is contained as the sub-component, it is possible to suppress the Ag diffusion into the interior of the dielectric substance from the internal conductor, so that non-uniformity of the dielectric property is prevented. It is possible to prevent occurrence of spaces between the internal conductor and the dielectric substance, or occurrence of leading-in of the internal conductor at the portion of communicating with the external part, resulting in improvement, miniaturization and cost-down of various properties of devices for high frequency.

Since the invention does not necessitate to contain glass composition as a sub-component, in addition to the improvement of the dielectric property, it is possible to reduce costs and remove unstable factors by saving the glass making process. As the inventive composition does not contain environmental contaminating substances as PbO, $Bi_2O_3$ and others, electronic devices adapting to recent demands for environmental protection may be offered, and any special treating facilities of waste liquid are not necessary, and production costs may be reduced. Further, PbO and $Bi_2O_3$ are easily evaporated, and the present composition does not contain these evaporating substances. Thus, there may be the composition of dielectric ceramics effective for removing unstable factors at production.

EXAMPLES

The invention will be explained in more detail showing examples.

Example 1

$BaCO_3$, $Nd(OH)_3$ and $TiO_2$ were used as raw materials of the main components, weighed such that the mixing ratios of BaO, $Nd_2O_3$ and $TiO_2$ after sintering were as shown in the column of the composition of the main components in Table 1, added with pure water to be 30% density of a slurry, wet-mixed in a ball mill for 16 hours, and then dried. Subsequently, the dried powder was sintering in the air (1250° C., 2 hours).

For the thus obtained sintering powders of the base materials, CuO, ZnO, and $B_2O_3$ as the sub-components were weighed to be as shown in the column of the composition of the sub-components in Table 1, added with pure water to be 33% density of a slurry, wet-mixed in the ball mill for 24 hours, and then dried. The dried powders were again sintering in the air (750° C., 2 hours). The thus obtained powders were added with pure water to be 33% density of the slurry, wet-pulverized in the ball mill for 24 hours, and dried. Then, the compositions of the dielectric ceramics (Samples 1 to 29) were obtained.

To 100 weight parts of the obtained composition for dielectric ceramics, 6.0 weight part of ethylcellulose as a binder and 90 weight parts of terpineol as a solvent were added, mixed, and dispersed by 3-piece rolls, and the dielectric paste was prepared. The dielectric paste and the Ag paste were alternately laminated by a screen process printing method, and cut into green chips of 4.5 mm×3.2 mm. The green chips were sinterd in the air for 2 hours (the sintering temperature was 1300° C. in only the Sample 1, and others 2 to 29 were at 920° C.), and adhered with Ag by sintering as the terminal conductors so as to make chip condensers having the structure as shown in FIG. 1 where in the chip condensers, the Ag internal conductor 1 and the dielectric substance 2 are alternately laminated, and the internal conductor 1 is connected at its outermost layers with the terminal conductor 3.

With respect to the above mentioned chip condensers, measurements were made on the low temperature sintering property (a practical level of the sintered density of dielectric substance 2 is above 5.0 g/cm³), the dielectric constant ∈, Q (=1/tan δ) and TCC (temperature coefficient of the dielectric constant from −25° C. to 85° C.), and the measured results are shown in Table 1. The unit of the sintered density in Table 1 is (g/cm³), the units of the dielectric constant ∈ and Q are dimensionless, and that of TCC is (ppm/° C.).

TABLE 1

| Sample Nos. | Composition of main elements (mol %) | | | Sub elements (wt %) | | | Calcining temp. (° C.) | Sintered density | Electrical properties | | |
|---|---|---|---|---|---|---|---|---|---|---|---|
| | BaO | Nd$_2$O$_3$ | TiO$_2$ | B$_2$O$_3$ | ZnO | CuO | | | $\epsilon$ | Q | TCC |
| 1* | 18.5 | 15.4 | 66.1 | 0 | 0 | 0 | 1,300 | — | — | — | — |
| 2* | 18.5 | 15.4 | 66.1 | 0.5 | 0 | 1 | 920 | 4.7 | — | — | — |
| 3* | 18.5 | 15.4 | 66.1 | 1 | 0 | 1 | 920 | 4.8 | — | — | — |
| 4* | 18.5 | 15.4 | 66.1 | 1.5 | 0 | 1 | 920 | 4.9 | — | — | — |
| 5* | 18.5 | 15.4 | 66.1 | 2 | 0 | 1 | 920 | 4.7 | — | — | — |
| 6* | 18.5 | 15.4 | 66.1 | 3 | 0 | 1 | 920 | 4.2 | — | — | — |
| 7 | 18.5 | 15.4 | 66.1 | 1 | 0.1 | 1 | 920 | 5.1 | 76 | 3750 | −85 |
| 8 | 18.5 | 15.4 | 66.1 | 1 | 1 | 1 | 920 | 5.3 | 82 | 3950 | −85 |
| 9 | 18.5 | 15.4 | 66.1 | 1 | 2 | 1 | 920 | 5.5 | 80 | 3880 | −77 |
| 10 | 18.5 | 15.4 | 66.1 | 1 | 3 | 1 | 920 | 5.1 | 76 | 4020 | −56 |
| 11 | 18.5 | 15.4 | 66.1 | 1 | 4 | 1 | 920 | 5.0 | 69 | 3200 | −45 |
| 12* | 18.5 | 15.4 | 66.1 | 1 | 5 | 1 | 920 | 4.8 | — | — | — |
| 13 | 18.5 | 15.4 | 66.1 | 0.1 | 2 | 1 | 920 | 5.0 | 77 | 3700 | −82 |
| 14 | 18.5 | 15.4 | 66.1 | 0.5 | 1 | 1 | 920 | 5.0 | 77 | 3750 | −84 |
| 15 | 18.5 | 15.4 | 66.1 | 0.5 | 2 | 1 | 920 | 5.1 | 77 | 3800 | −87 |
| 16 | 18.5 | 15.4 | 66.1 | 0.5 | 3 | 1 | 920 | 5.1 | 78 | 4020 | −56 |
| 17 | 18.5 | 15.4 | 66.1 | 1.5 | 1 | 1 | 920 | 5.3 | 82 | 4050 | −78 |
| 18 | 18.5 | 15.4 | 66.1 | 1.5 | 2 | 1 | 920 | 5.5 | 80 | 4200 | −65 |
| 19 | 18.5 | 15.4 | 66.1 | 2 | 1 | 1 | 920 | 5.3 | 80 | 3950 | −79 |
| 20 | 18.5 | 15.4 | 66.1 | 2 | 2 | 1 | 920 | 5.5 | 79 | 3800 | −66 |
| 21 | 18.5 | 15.4 | 66.1 | 3 | 2 | 1 | 920 | 5.1 | 72 | 3400 | −72 |
| 22* | 18.5 | 15.4 | 66.1 | 4 | 2 | 1 | 920 | 4.9 | — | — | — |
| 23* | 18.5 | 15.4 | 66.1 | 1 | 2 | 0 | 920 | 4.9 | — | — | — |
| 24 | 18.5 | 15.4 | 66.1 | 1 | 2 | 0.1 | 920 | 5.0 | 76 | 3850 | −70 |
| 25 | 18.5 | 15.4 | 66.1 | 1 | 2 | 0.25 | 920 | 5.1 | 76 | 3860 | −72 |
| 26 | 18.5 | 15.4 | 66.1 | 1 | 2 | 0.5 | 920 | 5.2 | 77 | 3880 | −72 |
| 27 | 18.5 | 15.4 | 66.1 | 1 | 2 | 0.75 | 920 | 5.2 | 78 | 3880 | −75 |
| 28 | 18.5 | 15.4 | 66.1 | 1 | 2 | 3 | 920 | 5.5 | 80 | 2100 | −36 |
| 29* | 18.5 | 15.4 | 66.1 | 1 | 2 | 4 | 920 | 5.5 | 80 | 840 | 5 |

*shows examples which is out of preferable range.

As shown in Table 1, if ZnO is not contained though CuO and B$_2$O$_3$ are contained (Samples 2 to 6), the sintered density at 920° C. is less than 5.0 g/cm$^3$ and a desired low temperature sintering property cannot be secured. According to the prior art technology, it is considered that B$_2$O$_3$ is most effective for improving the low temperature sintering property. However, as seen from the results of Samples 2 to 6, though the amount of B$_2$O$_3$ is increased, improvement of the low temperature sintering property is recognized until 1.5 wt %, but this improvement is limited. If the amount of B$_2$O$_3$ is further increased, the low temperature sintering property reversely becomes low. From this fact, it was confirmed that the desired low temperature sintering property could not be provided with only CuO and B$_2$O$_3$. On the other hand, though CuO, ZnO and B$_2$O$_3$ are included, if the amount of B$_2$O$_3$ exceeds 3 wt % (Sample 22), the sintered density at 920° C. is less than 5.0 g/cm$^3$ and the desired low temperature sintering property cannot be provided.

In contrast, when CuO, ZnO and B$_2$O$_3$ are within the range of the invention (Samples 7 to 11 and 13 to 21), even if the sintering temperature is 920° C., the sintered density exceeds the destined 5.0 g/cm$^3$. Then, seeing the dielectric property, the Q property is high (1000 or more), practically satisfied dielectric ceramicss are recognized. Further paying attentions to the dielectric constant $\epsilon$ and TCC, since they are little affected with influences by changing the ZnO or B$_2$O$_3$ amount, it was confirmed that the improving effects of the low temperature sintering property could be obtained by ZnO and B$_2$O$_3$ while maintaining the dielectric property of the main components.

The improvement of the low temperature sintering property by ZnO does not become higher as increasing of the ZnO amount. For example, if CuO is 1 wt % and B$_2$O$_3$ is 1 wt %, the low temperature sintering property is most preferable (the sintered density is maximum) also when ZnO is around 2 wt % (Sample 9). If ZnO is increased, the low temperature sintering property gradually lowers, and when ZnO exceeds 4 wt %, (Sample 12), the sintered density at 920° C. is less than 5.0 g/cm$^3$ and a desired low temperature sintering property could not be secured.

Further, the improvement of the low temperature sintering property by B$_2$O$_3$ does not become higher as increasing of the B$_2$O$_3$ amount. For example, when CuO is 1 wt % and ZnO is 2 wt % (Samples 13, 15, 18 and 20 to 22), the low temperature sintering property is most preferable (the sintered density is maximum) also when B$_2$O$_3$ is around 1.5 to 2 wt % (Samples 18 and 20). If B$_2$O$_3$ is increased, the low temperature sintering property gradually lowers, and when B$_2$O$_3$ exceeds 3 wt %, (Sample 22), the sintered density a 920° C. is less than 5.0 g/cm$^3$ and a desired low temperature sintering property could not be secured.

If CuO is not contained though B$_2$O$_3$ and ZnO are contained (Sample 23), the sintered density at 920° C. is less than 5.0 g/cm$^3$ and a desired low temperature sintering property could not be secured. But in addition to B$_2$O$_3$ and ZnO, if CuO is within the range of the invention (Samples 24 to 28), though the sintering temperature is 920° C., the sintered density is above the destined 5.0 g/cm$^3$. The improving effect of the low temperature sintering property by CuO becomes larger following the increasing of the CuO amount (increasing of the sintered density). Then, seeing the dielectric property, the Q property is above the destined 1000 or more, practically satisfied dielectric ceramicss are recognized. On the other hand, since the dielectric constant $\epsilon$ and TCC are little affected with influences by changing the CuO amount, it was confirmed that the improving effects of the low temperature sintering property could be obtained by CuO while maintaining the dielectric property of the main components.

If CuO exceeds 3 wt % of the inventive range (Sample 29), the Q property rapidly lowers and a desired dielectric ceramics could not be obtained.

As mentioned above, by containing the sub-components of CuO, ZnO and $B_2O_3$ within the inventive range (CuO: 0.1 to 3.0 wt %, ZnO: 0.1 to 4.0 wt %, and $B_2O_3$: 0.1 to 3.0 wt %), the composition of the dielectric ceramics having the low temperature sintering property below the Ag melting point can be provided, and by using this product, it is apparent that the dielectric ceramics having the practically sufficient dielectric property can be produced.

Example 2

$BaCO_3$, $Nd(OH)_3$ and $TiO_2$ were used as raw materials of the main components, weighed such that the mixing ratios of BaO, $Nd_2O_3$ and $TiO_2$ after sintering were as shown in the column of the composition of the main components in Table 2, added with a pure water to be 30% density of a slurry, wet-mixed in a ball mill for 16 hours, and then dried. Subsequently, the dried powder was calcined in the air (1250° C., 2 hours).

For the calcined powders obtained as above mentioned, CuO, ZnO and $B_2O_3$ as the sub-components were weighed to be as shown in the column of the composition of the sub-components in Table 2, added with pure water to be 33% density of a slurry, wet-mixed in the ball mill for 24 hours, and then dried. The dried powders were again calcined in the air (750° C., 2 hours). The obtained calcined powders were added with pure water to be 33% density of the slurry, wet-pulverized in the ball mill for 24 hours, and dried. Then, the compositions of the dielectric ceramics (Samples 30 to 57) were obtained.

To 100 weight parts of the obtained components for dielectric ceramics, 6.0 weight parts of ethylcellulose as a binder and 90 weight parts of terpineol as a solvent were added, mixed, and dispersed by 3-piece rolls, and the dielectric paste was prepared. The dielectric paste and the Ag paste were alternately laminated by a screen process printing method, and cut into green chips of 4.5 mm×3.2 mm. The green chips were sinterd in the air for 2 hours (sintering temperature was 920° C.), and adhered with Ag by sintering as the terminal electrodes so as to make chips condensers having the structure as shown in FIG. 1.

With respect to the above mentioned chip condensers, measurements were made, as Example 1, on the low temperature sintering property (a practical level of the sintered density of the dielectric substance 2 is above 5.0 g/cm³), the dielectric constant ∈, Q (=1/tan δ) and TCC (temperature coefficient of the dielectric constant from −25° C. to 85° C.), and the measured results are shown in Table 2. The unit of the sintered density in Table 2 is (g/cm³), the unit of the dielectric constant ∈ and Q are dimensionless, and that of TCC is (ppm/° C.).

TABLE 2

| Sample Nos. | Composition of main elements (mol %) | | | Sub elements (wt %) | | | Calcining temp. (° C.) | Electrical properties | | | |
|---|---|---|---|---|---|---|---|---|---|---|---|
| | BaO | $Nd_2O_3$ | $TiO_2$ | $B_2O_3$ | ZnO | CuO | | Sintered density | ∈ | Q | TCC |
| 30 | 9.45 | 24.42 | 66.13 | 1 | 2 | 1 | 920 | 5.4 | 61 | 5470 | 50 |
| 31 | 6.45 | 27.42 | 66.13 | 1 | 2 | 1 | 920 | 5.2 | 52 | 7340 | 106 |
| 32* | 6.45 | 24.42 | 69.13 | 1 | 2 | 1 | 920 | 4.5 | 67 | 2770 | −274 |
| 33* | 9.45 | 21.42 | 69.13 | 1 | 2 | 1 | 920 | 4.7 | 64 | 2620 | −291 |
| 34 | 12.45 | 21.42 | 66.13 | 1 | 2 | 1 | 920 | 5.5 | 67 | 5250 | −11 |
| 35* | 12.45 | 24.42 | 63.13 | 1 | 2 | 1 | 920 | 5.4 | 54 | 370 | 123 |
| 36* | 9.45 | 27.42 | 63.13 | 1 | 2 | 1 | 920 | 5.4 | 43 | 210 | 250 |
| 37 | 14.45 | 19.42 | 66.13 | 1 | 2 | 1 | 920 | 5.6 | 71 | 4740 | −18 |
| 38 | 16.45 | 17.42 | 66.13 | 1 | 2 | 1 | 920 | 5.7 | 77 | 4200 | −49 |
| 39 | 18.45 | 15.42 | 66.13 | 1 | 2 | 1 | 920 | 5.5 | 80 | 3880 | −77 |
| 40 | 16.45 | 18.42 | 65.13 | 1 | 2 | 1 | 920 | 5.7 | 71 | 3110 | 5 |
| 41 | 18.45 | 16.42 | 65.13 | 1 | 2 | 1 | 920 | 5.6 | 84 | 3870 | −73 |
| 42 | 16.45 | 19.42 | 64.13 | 1 | 2 | 1 | 920 | 5.6 | 68 | 2310 | 65 |
| 43 | 18.45 | 17.42 | 64.13 | 1 | 2 | 1 | 920 | 5.5 | 80 | 2780 | −31 |
| 44 | 20.45 | 15.42 | 64.13 | 1 | 2 | 1 | 920 | 5.5 | 93 | 2750 | −263 |
| 45 | 22.45 | 13.42 | 64.13 | 1 | 2 | 1 | 920 | 5.5 | 102 | 1210 | −210 |
| 46 | 21.45 | 13.42 | 65.13 | 1 | 2 | 1 | 920 | 5.5 | 97 | 1780 | −196 |
| 47 | 20.45 | 13.42 | 66.13 | 1 | 2 | 1 | 920 | 5.4 | 84 | 3200 | −127 |
| 48 | 6.00 | 30.00 | 64.00 | 1 | 2 | 1 | 920 | 5.7 | 47 | 2200 | 132 |
| 49 | 6.00 | 26.00 | 68.00 | 1 | 2 | 1 | 920 | 5.2 | 55 | 4290 | −119 |
| 50 | 12.50 | 19.50 | 68.00 | 1 | 2 | 1 | 920 | 5.2 | 70 | 3850 | −119 |
| 51 | 16.50 | 15.50 | 68.00 | 1 | 2 | 1 | 920 | 5.3 | 75 | 3850 | −119 |
| 52 | 19.00 | 13.00 | 68.00 | 1 | 2 | 1 | 920 | 5.3 | 81 | 2530 | −169 |
| 53* | 4.00 | 32.00 | 64.00 | 1 | 2 | 1 | 920 | 4.9 | 43 | 1980 | 157 |
| 54* | 4.00 | 30.00 | 66.00 | 1 | 2 | 1 | 920 | 4.8 | 47 | 7920 | 127 |
| 55* | 25.45 | 11.42 | 63.13 | 1 | 2 | 1 | 920 | 5.4 | 131 | 530 | −448 |
| 56* | 24.45 | 11.42 | 64.13 | 1 | 2 | 1 | 920 | 5.3 | 114 | 720 | −241 |
| 57* | 23.45 | 11.42 | 65.13 | 1 | 2 | 1 | 920 | 5.3 | 99 | 890 | −203 |

*shows examples which is out of preferable range.

As shown in Table 2, it is confirmed that if the main components of BaO, $Nd_2O_3$ and $TiO_2$ are within the inventive range, the composition of the dielectric ceramics has the low temperature sintering property (the sintered density after sintering at 920° C. is 5.0 g/cm³ or higher) and the dielectric property of the obtained dielectric ceramics is practically sufficient. As the ratio of $Nd_2O_3$ decreases and the ratio of BaO increases, the dielectric constant ∈ becomes larger and Q becomes lesser. TCC is shifted toward a positive direction as the ratio of $TiO_2$ increases.

On the other hand, if BaO is less 6 mol % (Samples 53 and 54), the low temperature sintering property cannot be secured and the dielectric constant ∈ also decreases. It is confirmed that when BaO exceeds 23 mol % (Samples 55 to 57), the Q property lowers (less than 1000).

It is recognized that when $Nd_2O_3$ is less than 13 mol % (Samples 55 to 57), the Q property decreases (less than 1000), and when $Nd_2O_3$ exceeds 30 mol % (Sample 53), the low temperature sintering property cannot be provided.

It is recognized that when $TiO_2$ is less than 64 mol % (Samples 35, 36 and 55), the Q property decreases (less than 1000), and when $TiO_2$ exceeds 68 mol % (Samples 32 and 33), the low temperature sintering property cannot be provided.

As mentioned above, by containing the main components of BaO, $Nd_2O_3$ and $TiO_2$ within the inventive range, the dielectric constant can be selected as broadly as 40 to 80 or more as keeping small absolute value of temperature coefficients thereof, and it is possible to obtain the composition of the dielectric ceramics enabling the sintering below the Ag melting point as holding the predetermined dielectric constant.

Example 3

$BaCO_3$, Nd $(OH)_3$ and $TiO_2$ were used as raw materials of the main components, weighed such that the mixing ratios of BaO, $Nd_2O_3$ and $TiO_2$ after sintering were as shown in the column of the composition of the main components in Table 3, added with pure water to be 30% density of a slurry, wet-mixed in a ball mill for 16 hours, and then dried. Subsequently, the dried powder was calcined in the air (1250° C., 2 hours).

For the thus obtained powders of the base materials, CuO, ZnO, $B_2O_3$ and Ag as the sub-components were weighed to be as shown in the column of the composition of the sub-components in Table 3, added with pure water to be 33% density of a slurry, wet-mixed in the ball mill for 24 hours, and then dried. The dried powders were again calcined in the air (750° C., 2 hours). The obtained calcined powders were added with pure water to be 33% density of the slurry, wet-pulverized in the ball mill for 24 hours, and dried. Then, the compositions of the dielectric ceramics (Samples 101 to 107) were obtained.

Figure 1B:
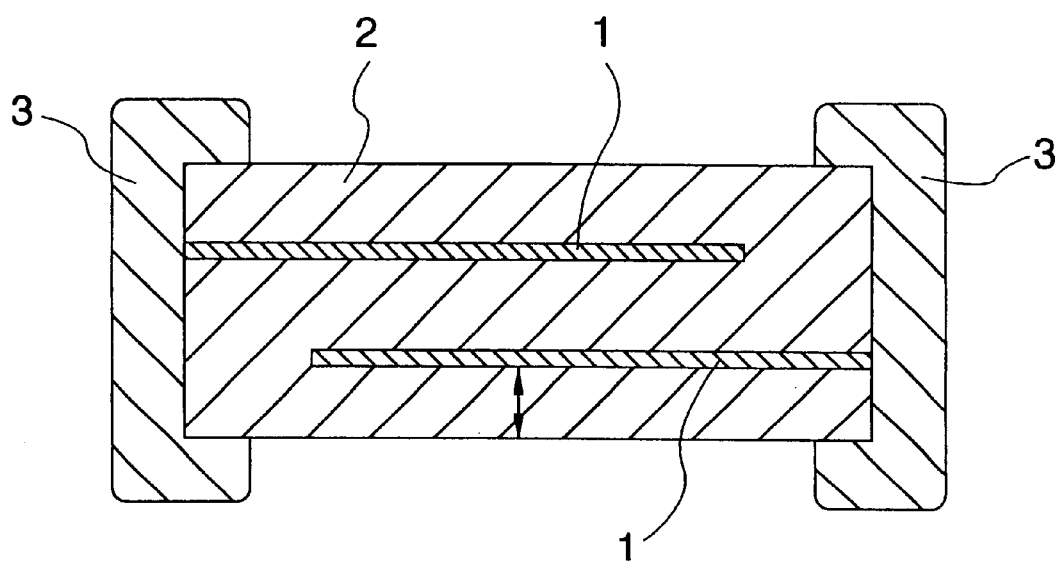

To 100 weight parts of the obtained composition for dielectric ceramics, 6.0 weight part of ethylcellulose as a binder and 90 weight parts of terpineol as a solvent were added, mixed, and dispersed by 3-piece rolls, and the dielectric paste was prepared. The dielectric paste and the Ag paste were alternately laminated by a screen process printing method, and cut into green chips of 4.5 mm×3.2 mm. The green chips were sinterd in the air for 2 hours (the sintering temperature was 920° C.), and sinterd with Ag as the terminal conductors so as to make chip capacitors having the structure as shown in FIGS. 1A and 1B where in the chip capacitors, the Ag internal conductor 1 and the dielectric substance 2 are alternately laminated, and the Ag internal conductor 1 is connected at its outermost layers with the terminal conductor 3.

With respect to each of the above mentioned chip capacitors, measurements were made on the low temperature sintering property (a practical level of the sintered density of dielectric substance 2 is above 5.0 g/cm$^3$), the dielectric constant ∈, Q (=1/tan δ) and TCC (temperature coefficient of the dielectric constant from −25° C. to 85° C.), and the measured results are shown in Table 3. The unit of the sintered density in Table 3 is (g/cm$^3$), the units of dielectric constant ∈ and Q are dimensionless, and that of TCC is (ppm/° C.).

Figure 2:
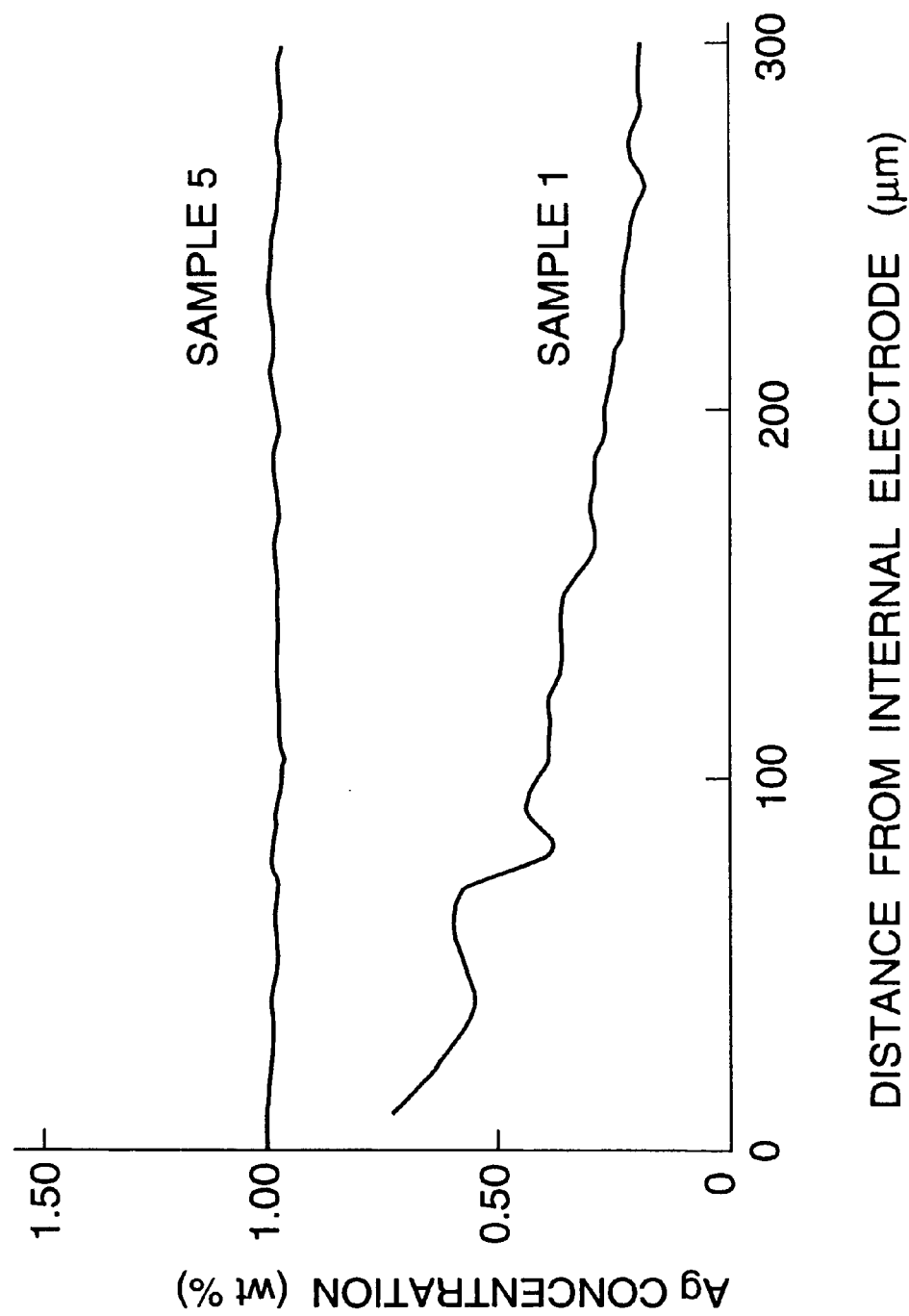
FIG. 2 is a view showing results analyzing distribution of Ag concentration in the dielectric substance matrix of the chip capacitor in Example 1.

With respect to the chip capacitors produced with the compositions of the dielectric ceramics of Samples 101 and 105, the grinding was advanced until the Ag internal conductor 1 (the part shown with an arrow mark in FIG. 1B), and the distribution of the Ag concentration by the distance from the Ag internal conductor 1 was analyzed with WDS (Wavelength Dispersive Spectrometer) by EPMA (Electron Probe Micro Analyzer), and the results are shown in FIG. 2.

TABLE 3

| Sample Nos. | Composition of main elements (mol %) | | | Sub elements (wt %) | | | | Calcining temp. (° C.) | Sintered density | Electrical properties | | |
|---|---|---|---|---|---|---|---|---|---|---|---|---|
| | BaO | $Nd_2O_3$ | $TiO_2$ | $B_2O_3$ | ZnO | CuO | Ag | | | ∈ | Q | TCC |
| 101* | 18.5 | 15.4 | 66.1 | 1.5 | 2 | 1 | 0 | 920 | 5.6 | 80 | 4200 | −65 |
| 102* | 18.5 | 15.4 | 66.1 | 1.5 | 2 | 1 | 0.1 | 920 | 5.5 | 82 | 4200 | −65 |
| 103 | 18.5 | 15.4 | 66.1 | 1.5 | 2 | 1 | 0.3 | 920 | 5.5 | 82 | 4200 | −65 |
| 104 | 18.5 | 15.4 | 66.1 | 1.5 | 2 | 1 | 0.5 | 920 | 5.5 | 84 | 4300 | −65 |
| 105 | 18.5 | 15.4 | 66.1 | 1.5 | 2 | 1 | 1 | 920 | 5.6 | 85 | 4300 | −66 |
| 106 | 18.5 | 15.4 | 66.1 | 1.5 | 2 | 1 | 1.5 | 920 | 5.6 | 85 | 4300 | −66 |
| 107* | 18.5 | 15.4 | 66.1 | 1.5 | 2 | 1 | 2 | 920 | 5.6 | 86 | 4300 | −66 |

*shows examples which is out of preferable range.

As shown in Table 3, the low temperature sintering property, the dielectric constant ∈, the Q property and TCC are all at the levels of practically no problem, irrespective of the Ag amount as the sub-component. But with respect to the dielectric constant ∈ which is one of the most important elements for designing high frequency devices, it becomes larger as increasing of the Ag amount.

Herein, as shown in FIG. 2, in the chip capacitor made of the composition of dielectric ceramics not containing Ag (Sample 101), Ag diffuses into the dielectric substance 2 from the internal conductor 1, and there exists the density distribution where the Ag concentration in the dielectric substance matrix near the internal conductor 1 is high, and it decreases as a distance from the internal conductor 1 becomes larger. In contrast, in the chip capacitor made of the composition of dielectric ceramics (Sample 105) containing Ag of the predetermined amount, it is confirmed that the Ag concentration in the dielectric substance matrix is substantially uniform and the Ag diffusion from the internal conductor 1 is suppressed. As above mentioned, in the chip capacitor made of the composition of dielectric ceramics not containing Ag (Sample 101), the distribution of the Ag concentration appears in the dielectric substance matrix, and at the same time a distribution of the dielectric constant also appears. In the composition of dielectric ceramics not containing Ag, it is difficult to provide device properties as designed. But in the chip capacitor made of the composition containing Ag of the predetermined amount, the Ag diffusion from the internal conductor is suppressed and the Ag concentration is almost uniform, so that it is possible to make least the dispersion of the dielectric property in the dielectric substance matrix and to provide desired device properties as designed.

Figure 3A:
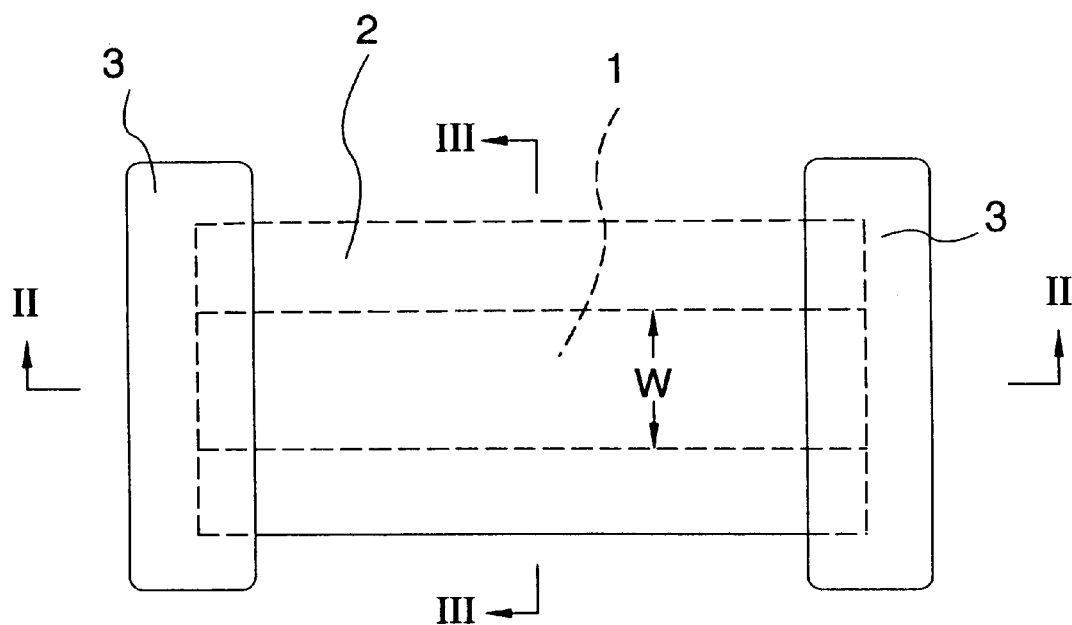
Figure 3B:
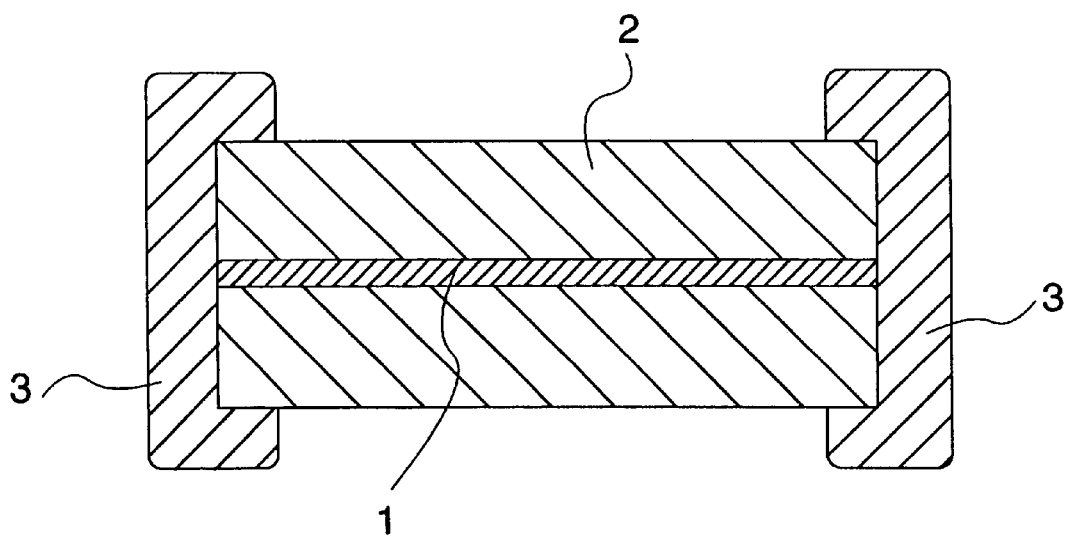
Figure 4:
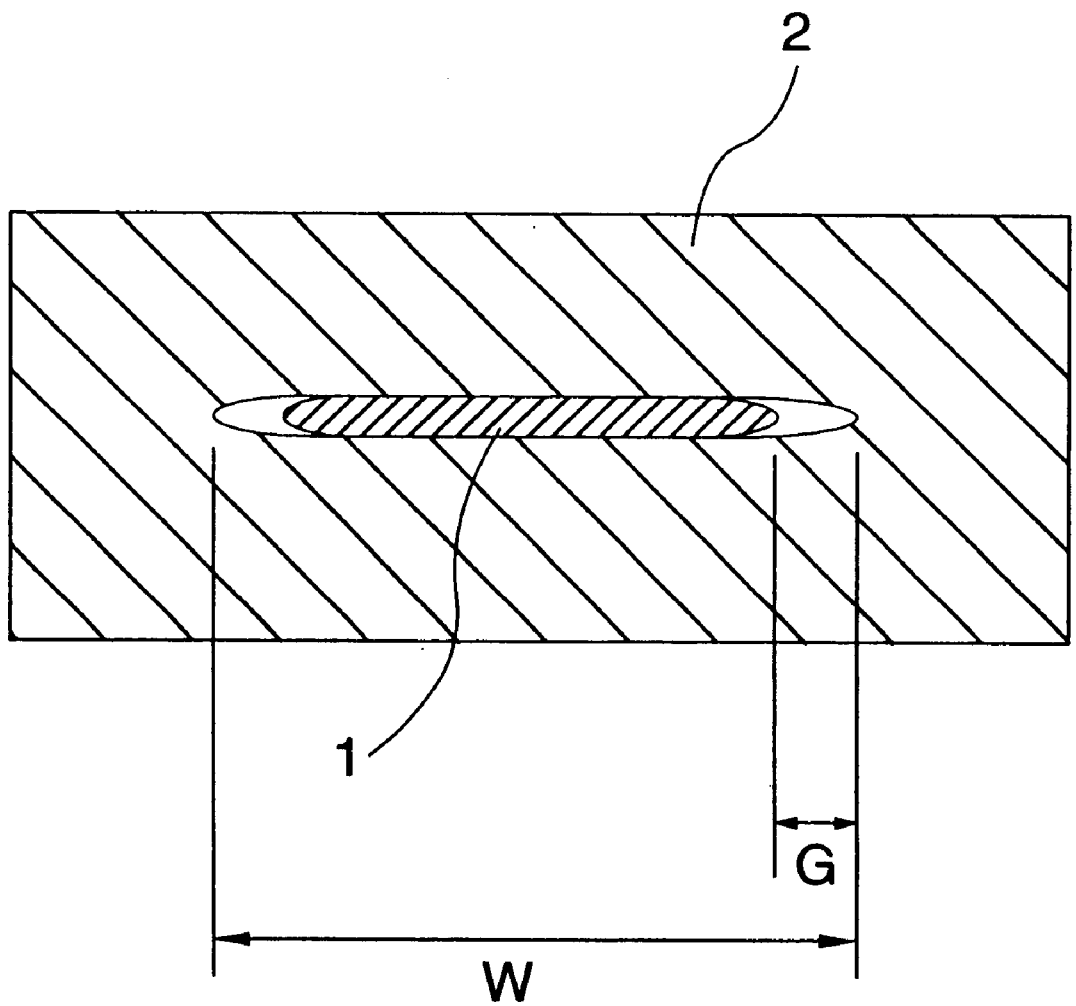
FIG. 4 is an enlarged view along III—III line in the Sample shown in FIG. 3A.

Depending upon the same method as making the chip capacitor, a green chip for testing conductivity was made by a screen printing method, sinterd in the air at 920° C. for 2 hours, and adhered by burning with Ag as a terminal conductor so as to turn out a sample for testing conductivity furnished with the internal conductor 1 (width W=100 μm), the dielectric substance 2 and the terminal conductors 3 as shown in FIG. 3. The conductivity between the terminal conductors 3 of the conductivity testing sample was measured by a tester, and badness of conductivity is shown in Table 4. The conductivity testing sample was ground until a destined portion of the internal conductor 1, and size G of the space created at ends of the internal conductor 1 as shown in FIG. 4 was measured and shown in Table 2.

TABLE 4

| Sample Nos. | Ag addition (wt %) | Calcining temp. (° C.) | Badness of conductivity (%) | Length of space (μm) |
|---|---|---|---|---|
| 101 * | 0 | 920 | 80 | 25 |
| 102 * | 0.1 | 920 | 20 | 11 |
| 103 | 0.3 | 920 | 0 | 3 |
| 104 | 0.5 | 920 | 0 | 1 |
| 105 | 1 | 920 | 0 | 0 |
| 106 | 1.5 | 920 | 0 | 0 |
| 107 * | 2 | 920 | 0 | 0 |

* shows examples which is out of preferable range..

As shown in Table 4, the space created between the internal conductor 1 and the dielectric substance 2 decreases as increasing of the Ag amount in the composition of the dielectric ceramics to be used. From this, it was confirmed that, by containing Ag in the composition of dielectric ceramics, the Ag diffusion from the internal conductor was suppressed, inconveniences caused by the spaces created at ends of the internal conductor (change in a pattern area of the internal conductor or dispersions in device property by change in a connection amount of electromagnetism) could be reduced and device properties as designed could be stably provided. From results of badness of conductivity, it is apparent that when Ag is less than 0.3 wt % (Samples 101 and 102), the lead-in of the internal conductor caused by the Ag diffusion occurs to create disorder of conduction. But if Ag is more than 0.3 wt %, the Ag diffusion from the internal conductor 1 is suppressed, so that the lead-in at the portion of connecting the terminal conductor 3 of the internal conductor is restrained, resulting in prevention of disorder of the conduction. When Ag exceeds 1.5 wt % (Sample 107), no problem arises in both of the capacitor property and the conductivity, but going over the uptake amount of Ag in the dielectric substance matrix, an extreme segregation of Ag appear to affect bad influences to a life of the capacitor.

Example 4

$BaCO_3$, $Nd(OH)_3$ and $TiO_2$ were used as raw materials of the main components, weighed such that the mixing ratios of BaO, $Nd_2O_3$ and $TiO_2$ after sintering were as shown in the column of the composition of the main components in Table 5, added with a pure water to be 30% density of a slurry, wet-mixed in a ball mill for 16 hours, and then dried. Subsequently, the dried powder was calcined in the air (1250° C., 2 hours).

For the powders obtained as above mentioned of the base materials, CuO, ZnO, $B_2O_3$ and $AgNO_3$ (in terms of Ag) as the sub-components were weighed to be as shown in the column of the composition of the sub-components in Table 5, added with a pure water to be 33% density of a slurry, wet-mixed in the ball mill for 24 hours, and then dried. The dried powders were again calcined in the air (750° C., 2 hours). The obtained calcined powders were added with pure water to be 33% density of the slurry, wet-pulverized in the ball mill for 24 hours, and dried. Then, the compositions of the dielectric ceramics (Samples 108 to 113) were obtained.

The paste of dielectric substance was prepared in the same manner as in Example 3 by using the composition of dielectric ceramics obtained as above. The paste of dielectric substance and the paste of Ag were used so as to produce a chip capacitor having the structure as shown in FIG. 1 and a sample for testing conductivity as shown in FIG. 3 in the same manner as Example 3.

With respect to each of the above mentioned chip capacitors, in the same manner as Example 3, measurements were made on the low temperature sintering property (a practical level of the density of dielectric substance 2 is above 5.0 g/cm³), the dielectric constant ∈, Q (=1/tan δ) and TCC (temperature coefficient of the dielectric constant from −25° C. to 85° C.), and the measured results are shown in Table 5. Further, as to Samples for testing conductivity, badness of conduction was measured as in Example 3, and results are shown in Table 6.

TABLE 5

| Sample Nos. | Composition of main elements (mol %) | | | Sub elements (wt %) | | | | Calcining temp. (° C.) | Electrical properties | | | |
|---|---|---|---|---|---|---|---|---|---|---|---|---|
| | BaO | $Nd_2O_3$ | $TiO_2$ | $B_2O_3$ | ZnO | CuO | Ag | | Sintered density | ∈ | Q | TCC |
| 108* | 18.5 | 15.4 | 66.1 | 1.5 | 2 | 1 | 0.1 | 920 | 5.5 | 82 | 4200 | −65 |
| 109 | 18.5 | 15.4 | 66.1 | 1.5 | 2 | 1 | 0.3 | 920 | 5.5 | 82 | 4200 | −65 |
| 110 | 18.5 | 15.4 | 66.1 | 1.5 | 2 | 1 | 0.5 | 920 | 5.5 | 84 | 4300 | −65 |
| 111 | 18.5 | 15.4 | 66.1 | 1.5 | 2 | 1 | 1 | 920 | 5.6 | 85 | 4300 | −66 |
| 112 | 18.5 | 15.4 | 66.1 | 1.5 | 2 | 1 | 1.5 | 920 | 5.6 | 85 | 4300 | −66 |
| 113* | 18.5 | 15.4 | 66.1 | 1.5 | 2 | 1 | 2 | 920 | 5.6 | 86 | 4300 | −66 |

*shows examples which is out of preferable range.

From the evaluated result of the chip capacitors shown in Table 5, the low temperature sintering property, the dielectric constant $\in$, the Q property and TCC are all at the levels of practically no problem, irrespective of the Ag amount as the sub-component. But also in this case, with respect to the dielectric constant $\in$ which is one of the most important elements for designing high frequency devices, it becomes larger as increasing of the Ag amount. In the chip capacitor produced of the composition of dielectric ceramics of insufficient Ag amount (Sample 108), there appears a distribution of the Ag concentration in the dielectric substance matrix as shown in FIG. 2, and concurrently, the distribution of the dielectric constant also appears. It was confirmed to be difficult to obtain device properties as designed in a composition of dielectric ceramics containing no or insufficient Ag (less than 0.3 wt %).

TABLE 6

| Sample Nos. | Ag addition (wt %) | Calcining temp. (° C.) | Badness of conductivity (%) |
|---|---|---|---|
| 108 * | 0.1 | 920 | 20 |
| 109 | 0.3 | 920 | 0 |
| 110 | 0.5 | 920 | 0 |
| 111 | 1 | 920 | 0 |
| 112 | 1.5 | 920 | 0 |
| 113 * | 2 | 920 | 0 |

* shows examples which is out of preferable range..

From the result of badness of the conduction shown in Table 6, it is apparent that although the form of the Ag addition as sub-component is changed, when Ag is less than 0.3 wt % (Sample 108) as in Example 3, the lead-in of the internal conductor caused by the Ag diffusion occurs to create disorder of conduction at the connecting part of the internal conductor 1 with the terminal conductor 3. But if Ag is more than 0.3 wt %, the Ag diffusion from the internal conductor is suppressed, so that the lead-in at the portion of connecting the terminal conductor 3 of the internal conductor 1 is restrained, resulting in prevention of disorder of the conduction. When Ag exceeds 1.5 wt % (Sample 113), no problem arises in both of the capacitor property and the conductivity, but going over the limit of the uptake amount of Ag in the dielectric substance matrix, an extreme segregation of Ag appear to affect bad influences to a life being as the capacitor.

As mentioned above, it was confirmed that also when the form of Ag addition was changed to $AgNO_3$, similar effects could be displayed as the addition of the Ag powder.

Example 5

$BaCO_3$, $Nd(OH)_3$ and $TiO_2$ were used as raw materials of the main components, weighed such that the mixing ratios of BaO, $Nd_2O_3$ and $TiO_2$ after sintering were as shown in the column of the composition of the main components in Table 7, added with pure water to be 30% density of a slurry, wet-mixed in a ball mill for 16 hours, and then dried. Subsequently, the dried powder was calcined in the air (1250° C., 2 hours).

For the powders obtained as above mentioned of the base materials, CuO, ZnO, and $B_2O_3$ as the sub-components were weighed to be as shown in the column of the composition of the sub-components in Table 7, added with a pure water to be 33% density of a slurry, wet-mixed in the ball mill for 24 hours, and then dried. The dried powders were again calcined in the air (750° C., 2 hours). The obtained calcined powders were added with Ag weighed to be amounts in relation with the powders of the base materials as shown in the columns of the sub-components in Table 7 and added with a pure water to be 33% density of the slurry, wet-pulverized in the ball mill for 24 hours, and dried. Then, the compositions of the dielectric ceramics (Samples 114 to 119) were obtained.

The paste of dielectric substance was prepared in the same manner as in Example 3 by using the composition of dielectric ceramics obtained as above. The paste of dielectric substance and the paste of Ag were used so as to produce a chip capacitor having the structure as shown in FIG. 1 and a sample for testing conductivity as shown in FIG. 3 in the same manner as Example 3.

With respect to each of the above mentioned chip capacitors, in the same manner as Example 3, measurements were made on the low temperature sintering property (a practical level of the density of dielectric substance 2 is above 5.0 g/cm³), the dielectric constant $\in$, Q (=1/tan δ) and TCC (temperature coefficient of the dielectric constant from −25° C. to 85° C.), and the measured results are shown in Table 7. Further, as to Samples for testing conductivity, badness of conduction was measured as in Example 3, and results are shown in Table 8.

TABLE 7

| Sample Nos. | Composition of main elements (mol %) | | | Sub elements (wt %) | | | | Calcining temp. (° C.) | Sintered density | Electrical properties | | |
|---|---|---|---|---|---|---|---|---|---|---|---|---|
| | BaO | $Nd_2O_3$ | $TiO_2$ | $B_2O_3$ | ZnO | CuO | Ag | | | $\epsilon$ | Q | TCC |
| 114* | 18.5 | 15.4 | 66.1 | 1.5 | 2 | 1 | 0.1 | 920 | 5.5 | 82 | 4200 | −65 |
| 115 | 18.5 | 15.4 | 66.1 | 1.5 | 2 | 1 | 0.3 | 920 | 5.5 | 82 | 4200 | −65 |
| 116 | 18.5 | 15.4 | 66.1 | 1.5 | 2 | 1 | 0.5 | 920 | 5.5 | 84 | 4300 | −65 |
| 117 | 18.5 | 15.4 | 66.1 | 1.5 | 2 | 1 | 1 | 920 | 5.6 | 85 | 4300 | −66 |
| 118 | 18.5 | 15.4 | 66.1 | 1.5 | 2 | 1 | 1.5 | 920 | 5.6 | 85 | 4300 | −66 |
| 119* | 18.5 | 15.4 | 66.1 | 1.5 | 2 | 1 | 2 | 920 | 5.6 | 86 | 4300 | −66 |

*shows examples which is out of preferable range.

From the evaluated result of the chip capacitors shown in Table 7, the low temperature sintering property, the dielectric constant $\in$, the Q property and TCC are all at the levels of practically no problem, irrespective of the Ag amount as the sub-component. But also in this case, with respect to the dielectric constant $\in$ which is one of the most important elements for designing high frequency devices, it becomes larger as increasing of the Ag amount. In the chip capacitor produced of the composition of dielectric ceramics of insufficient Ag amount (Sample 114), there appears a distribution of the Ag concentration in the dielectric substance matrix as shown in FIG. 2, and concurrently, the distribution of the dielectric constant also appears. It was confirmed to be difficult to obtain device properties as designed in a composition of dielectric ceramics containing no or insufficient Ag (less than 0.3 wt %).

TABLE 8

| Sample Nos. | Ag addition (wt %) | Calcining temp. (° C.) | Badness of conductivity (%) |
|---|---|---|---|
| 114 * | 0.1 | 920 | 20 |
| 115 | 0.3 | 920 | 0 |
| 116 | 0.5 | 920 | 0 |
| 117 | 1 | 920 | 0 |
| 118 | 1.5 | 920 | 0 |
| 119 * | 2 | 920 | 0 |

* shows examples which is out of preferable range..

From the result of badness of the conduction shown in Table 8, it is apparent that although the time of the Ag addition as sub-component is changed, when Ag is less than 0.3 wt % (Sample 114) as in Example 3, the lead-in of the internal conductor caused by the Ag diffusion occurs to create disorder of conduction as the connecting part of the internal conductor 1 with the terminal conductor 3. But if Ag is more than 0.3 wt %, the Ag diffusion from the internal conductor 1 is suppressed, so that the lead-in at the portion of connecting the terminal conductor 3 of the internal conductor is restrained, resulting in prevention of disorder of the conduction. When Ag exceeds 1.5 wt % (Sample 119), no problem arises in both of the capacitor property and the conductivity, but going over the limit of the uptake amount of Ag in the dielectric substance matrix, an extreme segregation of Ag appear to affect bad influences to a life being as the capacitor.

As mentioned, with respect to the addition time of the Ag, it was confirmed that an addition in the pulverizing step after the second temporary sintering brought about the same effects as additions concurrent with other sub-components (Examples 3 and 4).

Example 6

$BaCO_3$, $Nd(OH)_3$ and $TiO_2$ were used as raw materials of the main components, weighed such that the mixing ratios of BaO, $Nd_2O_3$ and $TiO_2$ after baking were as shown in the column of the composition of the main components in Table 9, added with a pure water to be 30% density of a slurry, wet-mixed in a ball mill for 16 hours, and then dried. Subsequently, the dried powder was calcined in the air (1250° C., 2 hours).

For the powders obtained as above mentioned of the base materials, CuO, ZnO, $B_2O_3$ and Ag as the sub-components were weighed to be as shown in the column of the composition of the sub-components in Table 9, added with pure water to be 33% density of a slurry, wet-mixed in the ball mill for 24 hours, and then dried. The dried powders were again temporarily sinterd in the air (750° C., 2 hours). The obtained calcined powders were added with pure water to be 33% density of the slurry, wet-pulverized in the ball mill for 24 hours, and dried. Then, the compositions of the dielectric ceramics (Samples 120 to 148) were obtained.

The paste of dielectric substance was prepared in the same manner as in Example 3 by using the composition of dielectric ceramics obtained as above. The paste of dielectric substance and the paste of Ag were used so as to produce a chip capacitor having the structure as shown in FIG. 1, provided that the sintering temperature of Sample 120 was 1300° C.

With respect to each of the above mentioned chip capacitors, in the same manner as Example 3, measurements were made on the low temperature sintering property (a practical level of the density of dielectric substance 2 is above 5.0 g/cm³), the dielectric constant ∈, Q (=1/tan δ) and TCC (temperature coefficient of the dielectric constant from −25° C. to 85° C.), and the measured results are shown in Table 9.

TABLE 7

| Sample Nos. | Composition of main elements (mol %) | | | Sub elements (wt %) | | | | Calcining temp. (° C.) | Electrical properties | | | |
|---|---|---|---|---|---|---|---|---|---|---|---|---|
| | BaO | $Nd_2O_3$ | $TiO_2$ | $B_2O_3$ | ZnO | CuO | Ag | | Sintered density | ∈ | Q | TCC |
| 120* | 18.5 | 15.4 | 66.1 | 0 | 0 | 0 | | 1,300 | — | — | — | — |
| 121* | 18.5 | 15.4 | 66.1 | 0.5 | 0 | 1 | 0.5 | 920 | 4.7 | — | — | — |
| 122* | 18.5 | 15.4 | 66.1 | 1 | 0 | 1 | 0.5 | 920 | 4.8 | — | — | — |
| 123* | 18.5 | 15.4 | 66.1 | 1.5 | 0 | 1 | 0.5 | 920 | 4.9 | — | — | — |
| 124* | 18.5 | 15.4 | 66.1 | 2 | 0 | 1 | 0.5 | 920 | 4.7 | — | — | — |
| 125* | 18.5 | 15.4 | 66.1 | 3 | 0 | 1 | 0.5 | 920 | 4.2 | — | — | — |
| 126 | 18.5 | 15.4 | 66.1 | 1 | 0.1 | 1 | 0.5 | 920 | 5.1 | 79 | 3800 | −85 |
| 127 | 18.5 | 15.4 | 66.1 | 1 | 1 | 1 | 0.5 | 920 | 5.3 | 84 | 4000 | −85 |
| 128 | 18.5 | 15.4 | 66.1 | 1 | 2 | 1 | 0.5 | 920 | 5.5 | 83 | 3900 | −77 |
| 129 | 18.5 | 15.4 | 66.1 | 1 | 3 | 1 | 0.5 | 920 | 5.1 | 79 | 4000 | −56 |
| 130 | 18.5 | 15.4 | 66.1 | 1 | 4 | 1 | 0.5 | 920 | 5.0 | 73 | 3200 | −45 |
| 131* | 18.5 | 15.4 | 66.1 | 1 | 5 | 1 | 0.5 | 920 | 4.8 | — | — | — |
| 132 | 18.5 | 15.4 | 66.1 | 0.1 | 2 | 1 | 0.5 | 920 | 5.0 | 80 | 3700 | −82 |
| 133 | 18.5 | 15.4 | 66.1 | 0.5 | 1 | 1 | 0.5 | 920 | 5.0 | 80 | 3750 | −84 |
| 134 | 18.5 | 15.4 | 66.1 | 0.5 | 2 | 1 | 0.5 | 920 | 5.1 | 80 | 3800 | −87 |
| 135 | 18.5 | 15.4 | 66.1 | 0.5 | 3 | 1 | 0.5 | 920 | 5.1 | 81 | 4020 | −56 |
| 136 | 18.5 | 15.4 | 66.1 | 1.5 | 1 | 1 | 0.5 | 920 | 5.3 | 85 | 4100 | −78 |
| 137 | 18.5 | 15.4 | 66.1 | 1.5 | 2 | 1 | 0.5 | 920 | 5.5 | 84 | 4300 | −65 |
| 138 | 18.5 | 15.4 | 66.1 | 2 | 1 | 1 | 0.5 | 920 | 5.3 | 84 | 4000 | −79 |
| 139 | 18.5 | 15.4 | 66.1 | 2 | 2 | 1 | 0.5 | 920 | 5.5 | 82 | 3800 | −66 |
| 140 | 18.5 | 15.4 | 66.1 | 3 | 2 | 1 | 0.5 | 920 | 5.1 | 76 | 3400 | −72 |
| 141* | 18.5 | 15.4 | 66.1 | 4 | 2 | 1 | 0.5 | 920 | 4.9 | — | — | — |
| 142* | 18.5 | 15.4 | 66.1 | 1 | 2 | 0 | 0.5 | 920 | 4.9 | — | — | — |
| 143 | 18.5 | 15.4 | 66.1 | 1 | 2 | 0.1 | 0.5 | 920 | 5.0 | 79 | 3900 | −70 |

TABLE 7-continued

| Sample Nos. | Composition of main elements (mol %) | | | Sub elements (wt %) | | | | Calcining temp. (° C.) | Electrical properties | | | |
|---|---|---|---|---|---|---|---|---|---|---|---|---|
| | BaO | Nd$_2$O$_3$ | TiO$_2$ | B$_2$O$_3$ | ZnO | CuO | Ag | | Sintered density | $\epsilon$ | Q | TCC |
| 144 | 18.5 | 15.4 | 66.1 | 1 | 2 | 0.25 | 0.5 | 920 | 5.1 | 79 | 3900 | −72 |
| 145 | 18.5 | 5.4 | 66.1 | 1 | 2 | 0.5 | 0.5 | 920 | 5.2 | 80 | 3900 | −72 |
| 146 | 18.5 | 15.4 | 66.1 | 1 | 2 | 0.75 | 0.5 | 920 | 5.2 | 81 | 3900 | −75 |
| 147 | 18.5 | 15.4 | 66.1 | 1 | 2 | 3 | 0.5 | 920 | 5.5 | 84 | 2100 | −36 |
| 148* | 18.5 | 15.4 | 66.1 | 1 | 2 | 4 | 0.5 | 920 | 5.5 | 84 | 840 | 5 |

*shows examples which is out of preferable range.

As shown in Table 9, if ZnO is not contained though CuO and B$_2$O$_3$ are contained (Samples 121 to 125), the sintered density at 920° C. is less than 5.0 g/cm$^3$ and a desired low temperature sintering property cannot be secured. According to the prior art technology, it is considered that B$_2$O$_3$ is most effective for improving the low temperature sintering property. However, as seen from the results of Samples 121 to 125, though the amount of B$_2$O$_3$ is increased, improvement of the low temperature sintering property is recognized until 1.5 wt %, but this improvement is limited. If the amount of B$_2$O$_3$ is further increased, the low temperature sintering property reversely becomes low. From this fact, it was confirmed that the desired low temperature sintering property could not be provided with only CuO, B$_2$O$_3$ and Ag. On the other hand, though CuO, ZnO, B$_2$O$_3$ and Ag are included, if the amount of B$_2$O$_3$ exceeds 3 wt % (Sample 141), the sintered density at 920° C. is less than 5.0 g/cm$^3$ and the desired low temperature sintering property cannot be provided.

In contrast, when CuO, ZnO, B$_2$O$_3$ and Ag are within the range of the invention (Samples 126 to 131 and 132 to 140), even if the sintering temperature is 920° C., the sintered density exceeds the destined 5.0 g/cm$^3$. Then, seeing the dielectric property, the Q property is high (1000 or more), practically satisfied dielectric ceramicss are recognized. Further paying attentions to the dielectric constant $\in$ and TCC, since they are little affected with influences by changing the ZnO or B$_2$O$_3$ amount, it was confirmed that the improving effects of the low temperature sintering property could be obtained by ZnO and B$_2$O$_3$ while maintaining the dielectric property of the main components.

The improvement of the low temperature sintering property by ZnO does not become higher as increasing of the ZnO amount. For example, when CuO is 1 wt %, B$_2$O$_3$ is 1 wt % and Ag is 0.5 wt %, the low temperature sintering property is most preferable (the sintered density is maximum), also when ZnO is around 2 wt % (Sample 128). If ZnO is increased, the low temperature sintering property gradually lowers, and when ZnO exceeds 4 wt %, (Sample 131), the sintered density at 920° C. is less than 5.0 g/cm$^3$ and a desired low temperature sintering property could not be secured.

Further, the improvement of the low temperature sintering property by B$_2$O$_3$ does not become higher as increasing of the B$_2$O$_3$ amount. For example, when CuO is 1 wt %, ZnO is 2 wt % and Ag is 0.5 wt % (Samples 132, 134, 137 and 139 to 141), the low temperature sintering property is most preferable (the sintered density is maximum) when B$_2$O$_3$ is around 1.5 to 2 wt % (Samples 137 and 139). If B$_2$O$_3$ is increased, the low temperature sintering property gradually lowers, and when ZnO exceeds 3 wt %, (Sample 141), the sintered density at 920° C. is less than 5.0 g/cm$^3$ and a desired low temperature sintering property could not be secured.

If CuO is not contained though B$_2$O$_3$, ZnO and Ag are contained (Sample 142), the sintered density at 920° C. is less than 5.0 g/cm$^3$ and a desired low temperature sintering property could not be secured. But in addition to B$_2$O$_3$, ZnO and Ag, if CuO is within the range of the invention (Samples 143 to 147), though the sintering temperature is 920° C., the sintered density is above the destined 5.0 g/cm$^3$. The improving effect of the low temperature sintering property by CuO becomes larger following the increasing of the CuO amount (increasing of the sintered density). Then, seeing the dielectric property, the Q property is above the destined 1000 or more, practically satisfied dielectric ceramicss are recognized. On the other hand, since the dielectric constant $\in$ and TCC are little affected with influences by changing the CuO amount, it was confirmed that the improving effects of the low temperature sintering property could be obtained by CuO while maintaining the dielectric property of the main components.

If CuO exceeds 3 wt % of the inventive range (Sample 148), the Q property rapidly lowers and a desired dielectric ceramics could not be obtained.

As mentioned above, by containing the sub-components of CuO, ZnO, B$_2$O$_3$ and Ag within the inventive range (CuO: 0.1 to 3.0 wt %, ZnO: 0.1 to 4.0 wt %, B$_2$O$_3$: 0.1 to 3.0 wt % and Ag: 0.3 to 1.5 wt %), the composition of the dielectric ceramics having the low temperature sintering property below the Ag melting point can be provided, and by using this product, it is apparent that the dielectric ceramics having the practically sufficient dielectric property can be produced.

Example 7

BaCO$_3$, Nd(OH)$_3$ and TiO$_2$ were used as raw materials of the main components, weighed such that the mixing ratios of BaO, Nd$_2$O$_3$ and TiO$_2$ after sintering were as shown in the column of the composition of the main components in Table 10, added with a pure water to be 30% density of a slurry, wet-mixed in a ball mill for 16 hours, and then dried. Subsequently, the dried powder was calcined in the air (1250° C., 2 hours).

For the powders obtained as above mentioned of the base materials, CuO, ZnO, B$_2$O$_3$ and Ag as the sub-components were weighed to be as shown in the column of the composition of the sub-components in Table 10, added with pure water to be 33% density of a slurry, wet-mixed in the ball mill for 24 hours, and then dried. The dried powders were again calcined in the air (750° C., 2 hours). The obtained calcined powders were added with pure water to be 33% density of the slurry, wet-pulverized in the ball mill for 24 hours, and dried. Then, the compositions of the dielectric ceramics (Samples 149 to 176) were obtained.

The paste of dielectric substance was prepared in the same manner as in Example 3 by using the composition of dielectric ceramics obtained as above. The paste of dielectric substance and the paste of Ag were used so as to produce a chip capacitor having the structure as shown in FIG. 1.

With respect to each of the above mentioned chip capacitors, in the same manner as Example 1, measurements were made on the low temperature sintering property (a practical level of the density of dielectric substance 2 is above 5.0 g/cm³), the dielectric constant ∈, Q (=1/tan δ) and TCC (temperature coefficient of the dielectric constant from −25° C. to 85° C.), and the measured results are shown in Table 10.

As mentioned above, by containing the main components of BaO, $Nd_2O_3$ and $TiO_2$ within the inventive range, the dielectric constant can be selected as broadly as 40 to 80 or more as keeping small absolute value of temperature coefficients thereof, and it is possible to obtain the composition of the dielectric ceramics enabling the sintering below the Ag melting point as holding the predetermined dielectric constant.

As mentioned above in detail, according to the invention, since the main components of BaO—$Nd_2O_3$—$TiO_2$ group in the predetermined range as well as Cu oxide, Zn oxide, B

TABLE 10

| Sample Nos. | Composition of main elements (mol %) | | | Sub elements (wt %) | | | | Calcining temp. (° C.) | Electrical properties | | | |
|---|---|---|---|---|---|---|---|---|---|---|---|---|
| | BaO | $Nd_2O_3$ | $TiO_2$ | $B_2O_3$ | ZnO | CuO | Ag | | Sintered density | ∈ | Q | TCC |
| 149 | 9.45 | 24.42 | 66.13 | 1 | 2 | 1 | 0.5 | 920 | 5.4 | 63 | 5470 | 50 |
| 150 | 6.45 | 27.42 | 66.13 | 1 | 2 | 1 | 0.5 | 920 | 5.2 | 55 | 7340 | 106 |
| 151* | 6.45 | 24.42 | 69.13 | 1 | 2 | 1 | 0.5 | 920 | 4.5 | 90 | 2770 | −274 |
| 152* | 9.45 | 21.42 | 69.13 | 1 | 2 | 1 | 0.5 | 920 | 4.7 | 67 | 2620 | −291 |
| 153 | 12.45 | 21.42 | 66.13 | 1 | 2 | 1 | 0.5 | 920 | 5.5 | 70 | 5250 | −11 |
| 154* | 12.45 | 24.42 | 63.13 | 1 | 2 | 1 | 0.5 | 920 | 5.4 | 57 | 370 | 123 |
| 155* | 9.45 | 27.42 | 63.13 | 1 | 2 | 1 | 0.5 | 920 | 5.4 | 47 | 210 | 250 |
| 156 | 14.45 | 19.42 | 66.13 | 1 | 2 | 1 | 0.5 | 920 | 5.6 | 75 | 4740 | −18 |
| 157 | 16.45 | 17.42 | 66.13 | 1 | 2 | 1 | 0.5 | 920 | 5.7 | 80 | 4200 | −49 |
| 158 | 18.45 | 15.42 | 66.13 | 1 | 2 | 1 | 0.5 | 920 | 5.5 | 83 | 3880 | −77 |
| 159 | 16.45 | 18.42 | 65.13 | 1 | 2 | 1 | 0.5 | 920 | 5.7 | 74 | 3110 | 5 |
| 160 | 18.45 | 16.42 | 65.13 | 1 | 2 | 1 | 0.5 | 920 | 5.6 | 86 | 3870 | −73 |
| 161 | 16.45 | 19.42 | 64.13 | 1 | 2 | 1 | 0.5 | 920 | 5.6 | 71 | 2310 | 65 |
| 162 | 18.45 | 17.42 | 64.13 | 1 | 2 | 1 | 0.5 | 920 | 5.5 | 84 | 2780 | −31 |
| 163 | 20.45 | 15.42 | 64.13 | 1 | 2 | 1 | 0.5 | 920 | 5.5 | 93 | 2750 | −263 |
| 164 | 22.45 | 13.42 | 64.13 | 1 | 2 | 1 | 0.5 | 920 | 5.5 | 105 | 1210 | −210 |
| 165 | 21.45 | 13.42 | 65.13 | 1 | 2 | 1 | 0.5 | 920 | 5.5 | 100 | 1780 | −196 |
| 166 | 20.45 | 13.42 | 66.13 | 1 | 2 | 1 | 0.5 | 920 | 5.4 | 87 | 3200 | −127 |
| 167 | 6.00 | 30.00 | 64.00 | 1 | 2 | 1 | 0.5 | 920 | 5.7 | 50 | 2200 | 132 |
| 168 | 6.00 | 26.00 | 68.00 | 1 | 2 | 1 | 0.5 | 920 | 5.2 | 59 | 4290 | −119 |
| 169 | 12.50 | 19.50 | 68.00 | 1 | 2 | 1 | 0.5 | 920 | 5.2 | 74 | 3850 | −119 |
| 170 | 16.50 | 15.50 | 68.00 | 1 | 2 | 1 | 0.5 | 920 | 5.3 | 79 | 3850 | −119 |
| 171 | 19.00 | 13.00 | 68.00 | 1 | 2 | 1 | 0.5 | 920 | 5.3 | 85 | 2530 | −169 |
| 172* | 4.00 | 32.00 | 64.00 | 1 | 2 | 1 | 0.5 | 920 | 4.9 | 45 | 1980 | 157 |
| 173* | 4.00 | 30.00 | 66.00 | 1 | 2 | 1 | 0.5 | 920 | 4.8 | 50 | 7920 | 127 |
| 174* | 25.45 | 11.42 | 63.13 | 1 | 2 | 1 | 0.5 | 920 | 5.4 | 131 | 530 | −448 |
| 175* | 24.45 | 11.42 | 64.13 | 1 | 2 | 1 | 0.5 | 920 | 5.3 | 115 | 720 | −241 |
| 176* | 23.45 | 11.42 | 65.13 | 1 | 2 | 1 | 0.5 | 920 | 5.3 | 102 | 890 | −203 |

*shows examples which is out of preferable range.

As shown in Table 10, it is confirmed that if the main components of BaO, $Nd_2O_3$ and $TiO_2$ are within the inventive range, the composition of the dielectric ceramics has the low temperature sintering property (the sintered density after sintering at 920° C. is 5.0 g/cm³) and the dielectric property of the obtained dielectric ceramics is practically sufficient. As the ratio of $Nd_2O_3$ decreases and the ratio of BaO increases, the dielectric constant ∈ becomes larger and Q becomes lesser. TCC is shifted toward a positive direction as the ratio of $TiO_2$ increases.

On the other hand, if BaO is less 6 mol % (Samples 172 and 173), the low temperature sintering property cannot be secured and the dielectric constant also decreases. It is confirmed that when BaO exceeds 23 mol % (Samples 174 to 176), the Q property lowers (less than 1000).

It is recognized that when $Nd_2O_3$ is less than 13 mol % (Samples 174 to 176), the Q property decreases (less than 1000), and when $Nd_2O_3$ exceeds 30 mol % (Sample 172), the low temperature sintering property cannot be provided.

It is recognized that when $TiO_2$ is less than 64 mol % (Samples 154, 155 and 174), the Q property decreases (less than 1000), and when $TiO_2$ exceeds 68 mol % (Samples 151 and 152), the low temperature sintering property cannot be provided.

oxide and Ag (Ag: if necessary) are contained, it is possible to provide the composition of the dielectric ceramics enabling to be sintered below the melting points of Ag or Cu, or alloys of Ag or Cu being the main component without decreasing the dielectric properties, thereby being capable of composing electronic parts where metals having low melting points as Ag or Ag alloys are internal conductors. As a result, it is possible to improve and miniaturize properties of devices for high frequency as well as reduce costs. In addition, in case of containing Ag, since Ag contained as one of the sub-components suppresses Ag diffusion into the interior of dielectric substance from the internal conductor, non-uniformity in the dielectric properties is prevented. In addition, prevention may be possible with respect to occurrence of spaces between the internal conductor and the dielectric substance or occurrence of leading-in of the internal conductor at a portion of connecting with an external part. Furthermore, in the invention, any glass composition as a sub-component are not necessitated, so that the property as the dielectric property can be prevented from deterioration, and since a process of making the glass is unnecessary, reduction of cost as well as removal of unstable factors are possible. Any of environmental contamination substances as PbO, $Bi_2O_3$ and others are not contained, so that it is possible to offer electronic devices meeting demands for recent environmental protection, and any special equipment for treating waste liquid is not required, enabling to reduce production costs. PbO and $Bi_2O_3$ are easily evaporated, and the invention does not include such volatile matters to enable to remove unstable factors during production.

What is claimed is:

1. Composition of dielectric ceramics, comprising:

a main component expressed with a general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$); and sub-components containing Cu oxides 0.1 to 3.0 wt % in terms of CuO, Zn oxide 0.1 to 4.0 wt % in terms of ZnO, and B oxide 0.1 to 3.0 wt % in term of $B_2O_3$.

2. The composition of dielectric ceramics according to claim 1, wherein said sub-components further contains Ag 0.3 to 3.0 wt %.

3. The composition of dielectric ceramics according to claim 1, wherein said sub-components further contains Cu oxide 0.5 to 1.5 wt % in terms of CuO.

4. A method for producing composition of dielectric ceramics, comprising the steps of:

(1) mixing raw materials of BaO, $Nd_2O_3$ and $TiO_2$, calcining them at temperature of 1100° C. or higher and manufacturing powders of base materials expressed with a general formula of $xBaO \cdot yNd_2O_3 \cdot zTiO_2$ (provided that the general formula has the relation of $6 \leq x \leq 23$, $13 \leq y \leq 30$, $64 \leq z \leq 68$ and $x+y+z=100$), (2) again calcining, at temperature of sintering temperature or lower of the base material powders, said powders mixed such that a sub-component in relation with the base powders fall into ranges of Cu oxides 0.1 to 3.0 wt % in terms of CuO, Zn oxide 0.1 to 4.0 wt % in terms of ZnO, and B oxide 0.1 to 3.0 wt % in term of $B_2O_3$; and (3) pulverizing the calcined powders until predetermined powder diameter.

5. The method according to claim 4, wherein in the (2) step, Ag 0.3 to 1.5 wt % is mixed in the sub-component.

6. The method according to claim 5, wherein an addition form of Ag as the sub-component is at least one kind of metallic Ag powder, $AgNO_3$, $Ag_2O$ and AgCl.

7. The method according to claim 4, further comprising the steps of: adding to the calcined powders Ag as a further sub-component to be range of 0.3 to 1.5 wt % in relation with the base material powders.

8. The method according to claim 7, wherein an addition form of Ag as the sub-component is at least one kind of metallic Ag powder, $AgNO_3$, $Ag_2O$ and AgCl.

9. The method according to claim 4, wherein the first calcining is carried out at predetermined temperature within the range of 1100 to 1350° C.

* * * * *